(12) United States Patent
Kanada et al.

(10) Patent No.: US 10,921,770 B2
(45) Date of Patent: *Feb. 16, 2021

(54) METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

(71) Applicants: SUMITOMO ELECTRIC HARDMETAL CORP., Itami (JP); Sumitomo Electric Industries, Ltd., Osaka (JP); Sumitomo Electric Tool Net, Inc., Osaka (JP)

(72) Inventors: Yasuyuki Kanada, Itami (JP); Kunishige Tanaka, Itami (JP); Shota Takemura, Itami (JP); Soichiro Okumura, Itami (JP); Jun Okamoto, Osaka (JP); Futoshi Takeshita, Osaka (JP)

(73) Assignees: Sumitomo Electric Hardmetal Corp., Itami (JP); Sumitomo Electric Industries, Ltd., Osaka (JP); Sumitomo Electric Tool Net, Inc., Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 16/082,034

(22) PCT Filed: Feb. 7, 2017

(86) PCT No.: PCT/JP2017/004380
§ 371 (c)(1),
(2) Date: Sep. 4, 2018

(87) PCT Pub. No.: WO2017/150097
PCT Pub. Date: Sep. 8, 2017

(65) Prior Publication Data
US 2019/0291187 A1    Sep. 26, 2019

(30) Foreign Application Priority Data

Mar. 4, 2016 (JP) .................................. 2016-042502

(51) Int. Cl.
*G05B 19/19* (2006.01)
*B23B 1/00* (2006.01)
(Continued)

(52) U.S. Cl.
CPC ............... *G05B 19/19* (2013.01); *B23B 1/00* (2013.01); *G05B 19/182* (2013.01);
(Continued)

(58) Field of Classification Search
CPC .... G05B 19/182; G05B 19/19; G05B 19/402; G05B 19/404; G05B 19/4093;
(Continued)

(56) References Cited

U.S. PATENT DOCUMENTS

| 6,952,987 B2 | 10/2005 | Schreiber et al. |
| 7,216,571 B2 | 5/2007 | Schreiber et al. |

(Continued)

FOREIGN PATENT DOCUMENTS

| CN | 103878626 A | 6/2014 |
| DE | 102006011300 B3 | 9/2007 |

(Continued)

OTHER PUBLICATIONS

Restriction requirement issued in U.S. Appl. No. 15/758,036 dated Jun. 25, 2019.

(Continued)

*Primary Examiner* — Crystal J Barnes-Bullock
(74) *Attorney, Agent, or Firm* — Baker Botts L.L.P.; Michael A. Sartori

(57) ABSTRACT

A method for manufacturing a machine component includes determining a track of a cutting edge and feeding the cutting edge along the track. The determining a track includes (Continued)

calculating a coordinate (X(t), Y(t), Z(t)) of a first end portion of the cutting edge in accordance with X(t)=($R_{sh}$(t) cos φ(t)−$X_{chip}$(t)), Y(t)=($R_{sh}$(t)sin φ(t)−$Y_{chip}$(t)), and Z(t)=($Z_{sh}$(t)−$Z_{chip}$(t)), where a variable t assumes (N+1) values not smaller than 0 and not greater than 1. φ(t) represents an angle formed by a straight line connecting a point of cutting projected on an XY plane and an origin of the XY plane to each other with respect to an X axis, and φ(t) satisfies a condition $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

6 Claims, 14 Drawing Sheets

(51) Int. Cl.
  *G05B 19/18* (2006.01)
  *G05B 19/4093* (2006.01)
  *G05B 19/402* (2006.01)

(52) U.S. Cl.
  CPC ....... *G05B 19/402* (2013.01); *G05B 19/4093* (2013.01); *G05B 2219/35263* (2013.01); *G05B 2219/49343* (2013.01)

(58) Field of Classification Search
  CPC .... G05B 19/40937; G05B 2219/35263; G05B 2219/37506; G05B 2219/49087; G05B 2219/49193; G05B 2219/49343; B23B 1/00; B23B 5/36; B23C 3/16; B23Q 15/22
  See application file for complete search history.

(56) References Cited

U.S. PATENT DOCUMENTS

| | | |
|---|---|---|
| 2003/0089204 A1 | 5/2003 | Schreiber et al. |
| 2010/0175518 A1 | 7/2010 | Nille |
| 2016/0288214 A1 | 10/2016 | Ishihara |
| 2018/0200802 A1* | 7/2018 | Kanada ............... B23B 5/36 |
| 2018/0257145 A1* | 9/2018 | Kanada ............... B23B 1/00 |
| 2019/0152010 A1* | 5/2019 | Kanada ............ G05B 19/402 |
| 2019/0270141 A1* | 9/2019 | Kanada ............... B23B 1/00 |

FOREIGN PATENT DOCUMENTS

| | | |
|---|---|---|
| EP | 3246774 A1 | 11/2017 |
| EP | 3 348 339 A1 | 7/2018 |
| JP | 2009-241221 A | 10/2009 |
| WO | 01/43902 A2 | 6/2001 |
| WO | 2013/088884 A1 | 6/2013 |
| WO | 2015/079836 A1 | 6/2015 |

OTHER PUBLICATIONS

Notice of Allowance issued in U.S. Appl. No. 15/758,036 dated Sep. 11, 2019.

* cited by examiner

METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

TECHNICAL FIELD

The present invention relates to a method for manufacturing a machine component, an apparatus for manufacturing a machine component, a method for machining a rotation symmetry plane, a recording medium having a program for a manufacturing method recorded thereon, and the program. The present application claims priority to Japanese Patent Application No. 2016-042502 filed on Mar. 4, 2016, the entire contents of which are incorporated herein by reference.

BACKGROUND ART

International Publication No. 2001/043902 (PTL 1) discloses a method of machining a workpiece with a linear cutting edge. The cutting edge is set as being inclined with respect to a direction of feed and fed in a direction transverse to an axial line of rotation of the workpiece. With this machining method, a surface of the workpiece can be machined to be smooth and highly efficient machining can be achieved.

CITATION LIST

Patent Literature

PTL 1: International Publication No. 2001/043902

SUMMARY OF INVENTION

A method for manufacturing a machine component according to one manner of the present invention is a method for manufacturing a machine component having a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track includes calculating a coordinate (X(t), Y(t), Z(t)) of a first end portion of the cutting edge in accordance with X(t)=($R_{sh}$(t)cos ϕ(t)−$X_{chip}$(t)), Y(t)=($R_{sh}$(t) sin ϕ(t)$Y_{chip}$(t)), and Z(t)=($Z_{sh}$(t)−$Z_{chip}$(t)), where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. ($X_{chip}$(t), $Y_{chip}$(t), $Z_{chip}$(t)) represents a coordinate representing a position of the cutting edge in contact with the rotation symmetry plane at the point of cutting with the first end portion of the cutting edge being defined as a reference. ($X_{chip}$(1), $Y_{chip}$(1), $Z_{chip}$(1)) represents a coordinate of a second end portion of the cutting edge positioned at a cutting end position of the rotation symmetry plane. $R_{sh}$(t) represents a radius of the rotation symmetry plane corresponding to a distance from a center of rotation on the Z axis to the point of cutting. $Z_{sh}$(t) represents a coordinate on the Z axis of the center of rotation. ϕ(t) represents an angle formed by a straight line connecting the point of cutting projected on an XY plane and an origin of the XY plane to each other with respect to the X axis. ϕ(t) satisfies a condition of $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

θ(t) represents an angle formed by an ith region in contact with the point of cutting of the N regions of the cutting edge with respect to the Z axis when the ith region is projected on an XZ plane. β(t) represents an angle formed by the ith region with respect to the Z axis when the ith region is projected on a YZ plane. $θ_s$(t) represents an angle representing a target inclination of the rotation symmetry plane at the point of cutting.

DETAILED DESCRIPTION

Figure 1:
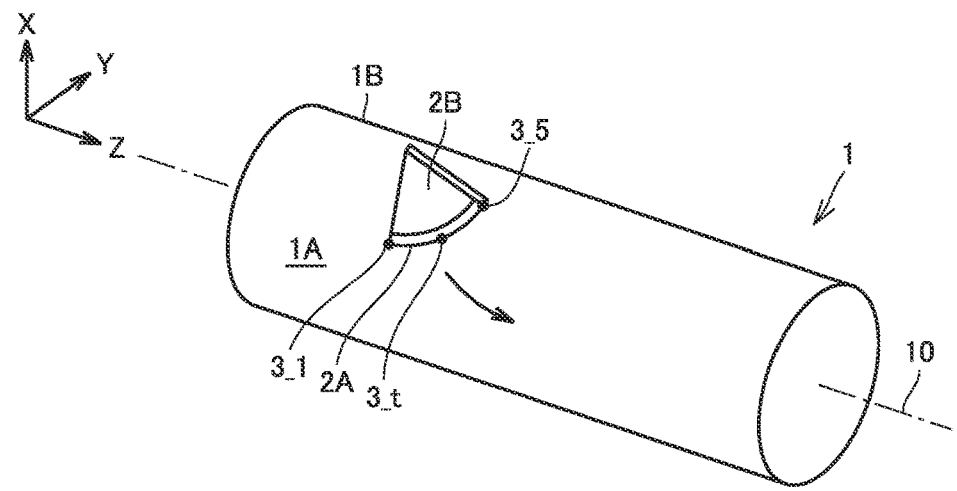
FIG. 1 is a perspective view showing a manufacturing method according to one embodiment of the present invention.

Problem to be Solved by the Present Disclosure

International Publication No. 2001/043902 discloses a side surface of a column as a rotation symmetry plane. There are explicit or potential needs for accurate machining of a workpiece including a side surface of a column by cutting.

An object of the present disclosure is to provide a technique for accurately machining a workpiece including a side surface of a column by cutting.

DESCRIPTION OF EMBODIMENTS

Embodiments of the present invention will initially be listed and described.

(1) A method for manufacturing a machine component according to one manner of the present invention is a method for manufacturing a machine component having a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track includes calculating a coordinate (X(t), Y(t), Z(t)) of a first end portion of the cutting edge in accordance with X(t)=($R_{sh}$(t)cos φ(t)−$X_{chip}$(t)), Y(t)=($R_{sh}$(t) sin φ(t)−$Y_{chip}$(t)), and Z(t)=($Z_{sh}$(t)−$Z_{chip}$(t)), where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. ($X_{chip}$(t), $Y_{chip}$(t), $Z_{chip}$(t)) represents a coordinate representing a position of the cutting edge in contact with the rotation symmetry plane at the point of cutting with the first end portion of the cutting edge being defined as a reference. ($X_{chip}$(1), $Y_{chip}$(1), $Z_{chip}$(1)) represents a coordinate of a second end portion of the cutting edge positioned at a cutting end position of the rotation symmetry plane. $R_{sh}$(t) represents a radius of the rotation symmetry plane corresponding to a distance from a center of rotation on the Z axis to the point of cutting. $Z_{sh}$(t) represents a coordinate on the Z axis of the center of rotation. φ(t) represents an angle formed by a straight line connecting the point of cutting projected on an XY plane and an origin of the XY plane to each other with respect to the X axis. φ(t) satisfies a condition of $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

θ(t) represents an angle formed by an ith region in contact with the point of cutting of the N regions of the cutting edge with respect to the Z axis when the ith region is projected on an XZ plane. β(t) represents an angle formed by the ith region with respect to the Z axis when the ith region is projected on a YZ plane. $θ_s$(t) represents an angle representing a target inclination of the rotation symmetry plane at the point of cutting.

According to the above, a machine component including a side surface of a column as the rotation symmetry plane can highly accurately be machined. A linear or curved cutting edge is fed as being in contact with the point of cutting of the rotation symmetry plane. More specifically, the cutting edge is fed such that the N regions defined by division of the cutting edge successively come in contact with the rotation symmetry plane. As the rotation symmetry plane is machined with the entire cutting edge, accuracy in terms of surface roughness of the rotation symmetry plane (a machined surface) can be high. Namely, a smoother surface can be obtained. Furthermore, an inclination of the cutting edge at the point of cutting affects a radius of the machined rotation symmetry plane. When a first inclination (an inclination of a tangent line at a point of cutting in each of N regions) deviates from a second inclination (a target inclination of a tangent line which passes through the point of cutting and comes in contact with the rotation symmetry plane), the radius of the rotation symmetry plane will be different from a target value. Namely, a workpiece is excessively or insufficiently cut away. The plane including the Z axis and the point of cutting is a cut plane of the rotation symmetry plane (a cut plane of the machine component). The track of the cutting edge satisfies the condition that the first inclination is equal to the target inclination of the tangent line which passes through the point of cutting and comes in contact with the rotation symmetry plane on this plane. The cutting edge is fed along this track. Therefore, the rotation symmetry plane can be formed in conformity with a target shape.

The "first inclination being equal to the second inclination" is not limited to an example in which they are perfectly equal to each other but also encompasses an example in which the first inclination is substantially equal to the second inclination. "Substantially equal" encompasses, for example, a case that a difference between the first inclination and the second inclination is not greater than a minimum measurement value. When manufacturing tolerance has been set and when a difference between the first inclination and the second inclination is within the tolerance, the first inclination and the second inclination may be regarded as being substantially equal to each other.

(2) Preferably, the cutting edge is in a curved shape, and t is determined to divide a central angle determined in accordance with a radius of curvature of the curved shape into N equal parts.

According to the above, the track of the curved cutting edge can be determined.

(3) Preferably, the cutting edge is linear, and t is determined to divide a length of the cutting edge between the first end portion and the second end portion into N equal parts.

According to the above, the track of the linear cutting edge can be determined.

(4) An apparatus for manufacturing a machine component according to one manner of the present invention is an apparatus with which the method for manufacturing a machine component described in any of (1) to (3) above is performed.

According to the above, the rotation symmetry plane of the machine component can accurately be machined. Consequently, the machine component can accurately be manufactured.

(5) A machining method according to one manner of the present invention is a method for machining a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track includes calculating a coordinate (X(t), Y(t), Z(t)) of a first end portion of the cutting edge in accordance with $X(t)=(R_{sh}(t)\cos \phi(t)-X_{chip}(t))$, $Y(t)=(R_{sh}(t)\sin \phi(t)-Y_{chip}(t))$, and $Z(t)=(Z_{sh}(t)-Z_{chip}(t))$, where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. $(X_{chip}(t), Y_{chip}(t), Z_{chip}(t))$ represents a coordinate representing a position of the cutting edge in contact with the rotation symmetry plane at the point of cutting with the first end portion of the cutting edge being defined as a reference. $(X_{chip}(1), Y_{chip}(1), Z_{chip}(1))$ represents a coordinate of a second end portion of the cutting edge positioned at a cutting end position of the rotation symmetry plane. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. $\phi(t)$ represents an angle formed by a straight line connecting the point of cutting projected on an XY plane and an origin of the XY plane to each other with respect to the X axis. $\phi(t)$ satisfies a condition of $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

$\theta(t)$ represents an angle formed by an ith region in contact with the point of cutting of the N regions of the cutting edge with respect to the Z axis when the ith region is projected on an XZ plane. $\beta(t)$ represents an angle formed by the ith region with respect to the Z axis when the ith region is projected on a YZ plane. $\theta_s(t)$ represents an angle representing a target inclination of the rotation symmetry plane at the point of cutting.

According to the above, the machine component including a side surface of a column as the rotation symmetry plane can highly accurately be machined.

(6) A recording medium according to one manner of the present invention is a computer readable recording medium having a program recorded thereon, the program being for manufacturing a machine component having a rotation symmetry plane. The program causes a computer to perform machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track includes calculating a coordinate (X(t), Y(t), Z(t)) of a first end portion of the cutting edge in accordance with $X(t)=(R_{sh}(t)\cos \phi(t)-X_{chip}(t))$, $Y(t)=(R_{sh}(t)\sin \phi(t)-Y_{chip}(t))$, and $Z(t)=(Z_{sh}(t)-Z_{chip}(t))$, where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. $(X_{chip}(t), Y_{chip}(t), Z_{chip}(t))$ represents a coordinate representing a position of the cutting edge in contact with the rotation symmetry plane at the point of cutting with the first end portion of the cutting edge being defined as a reference. $(X_{chip}(1), Y_{chip}(1), Z_{chip}(1))$ represents a coordinate of a second end portion of the cutting edge positioned at a cutting end position of the rotation symmetry plane. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. $\phi(t)$ represents an angle formed by a straight line connecting the point of cutting projected on an XY plane and an origin of the XY plane to each other with respect to the X axis. $\phi(t)$ satisfies a condition of $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

$\theta(t)$ represents an angle formed by an ith region in contact with the point of cutting of the N regions of the cutting edge with respect to the Z axis when the ith region is projected on an XZ plane. $\beta(t)$ represents an angle formed by the ith region with respect to the Z axis when the ith region is projected on a YZ plane. $\theta_s(t)$ represents an angle representing a target inclination of the rotation symmetry plane at the point of cutting.

According to the above, the machine component including a side surface of a column as the rotation symmetry plane can highly accurately be machined.

(7) A program according to one manner of the present invention is a program for manufacturing a machine component having a rotation symmetry plane. The program causes a computer to perform machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track includes calculating a coordinate (X(t), Y(t), Z(t)) of a first end portion of the cutting edge in accordance with $X(t)=(R_{sh}(t)\cos\phi(t)-X_{chip}(t))$, $Y(t)=(R_{sh}(t)\sin\phi(t)-Y_{chip}(t))$, and $Z(t)=(Z_{sh}(t)-Z_{chip}(t))$, where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. ($X_{chip}(t)$, $Y_{chip}(t)$, $Z_{chip}(t)$) represents a coordinate representing a position of the cutting edge in contact with the rotation symmetry plane at the point of cutting with the first end portion of the cutting edge being defined as a reference. ($X_{chip}(1)$, $Y_{chip}(1)$, $Z_{chip}(1)$) represents a coordinate of a second end portion of the cutting edge positioned at a cutting end position of the rotation symmetry plane. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. $\phi(t)$ represents an angle formed by a straight line connecting the point of cutting projected on an XY plane and an origin of the XY plane to each other with respect to the X axis. $\phi(t)$ satisfies a condition of $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}}.$$

$\theta(t)$ represents an angle formed by an ith region in contact with the point of cutting of the N regions of the cutting edge with respect to the Z axis when the ith region is projected on an XZ plane. $\beta(t)$ represents an angle formed by the ith region with respect to the Z axis when the ith region is projected on a YZ plane. $\theta_s(t)$ represents an angle representing a target inclination of the rotation symmetry plane at the point of cutting.

According to the above, the machine component including a side surface of a column as the rotation symmetry plane can highly accurately be machined.

Details of Embodiments of the Present Invention

Embodiments of the present invention will be described hereinafter with reference to the drawings. The same or corresponding elements in the drawings below have the same reference characters allotted and description thereof will not be repeated. For better understanding of the description, only some of constituent elements of the invention may be shown in the drawings.

FIG. 1 is a perspective view showing a manufacturing method according to one embodiment of the present invention. As shown in FIG. 1, a machine component 1 having a rotation symmetry plane (machined surface) 1A rotates around an axial line of rotation 10. Machine component 1 is a product manufactured with the manufacturing method according to one embodiment of the present invention.

FIG. 1 shows a machining step representing one step in the manufacturing method according to one embodiment of the present invention. Therefore, in the step shown in FIG. 1, machine component 1 can also be called a workpiece. The machining step includes cutting. The manufacturing method according to one embodiment of the present invention may include other steps. The manufacturing method can include, for example, a casting step, an assembly step, and an inspection step.

In the manufacturing method according to one embodiment of the present invention, feed of a cutting edge 2A is controlled in accordance with a three-dimensional orthogonal coordinate system. In FIG. 1, a Z axis corresponds to axial line of rotation 10. An X axis and a Y axis are both perpendicular to the Z axis and perpendicular to each other. The X axis can be set to a direction determining a dimension of a diameter or a radius of the rotation symmetry plane, which is also referred to as a radial direction or a direction of edge feed in cutting and machining. The Y axis is an axis orthogonal to both of the X axis and the Z axis and called, for example, a lateral direction or a direction of rotation. For example, axes defined as the X axis, the Y axis, and the Z axis in a lathe can be applied to the X axis, the Y axis, and the Z axis in the embodiment of the present invention.

In this embodiment, the direction of the Z axis is defined as a direction of feed (vertical feed) of cutting edge 2A. A negative direction of the X axis is defined as a direction of cut into machine component 1. The direction of the Y axis is defined as a direction opposite to a direction of movement of cutting edge 2A for cutting.

Cutting edge 2A is a part of a cutting insert 2B. Cutting insert 2B is attachable to and removable from a holder (tool). FIG. 1 does not show a holder. When it is not necessary to distinguish between cutting edge 2A and cutting insert 2B, both of them are collectively referred to as the "cutting edge" below.

Cutting edge 2A is fed along a track having an X-axis component, a Y-axis component, and a Z-axis component while it is in contact with machine component 1. During a period from start of cutting to end of cutting, individual regions of cutting edge 2A from a tip end 3_1 to a rear end 3_5 successively come in contact with a surface to be machined (rotation symmetry plane 1A). A position in rotation symmetry plane 1A where cutting edge 2A is in contact therewith is called a "point of cutting" below. In FIG. 1, a point 3_t represents a position of cutting edge 2A in contact with the point of cutting of rotation symmetry plane 1A. Rotation symmetry plane 1A is formed by movement of cutting edge 2A.

Rotation symmetry plane 1A can be determined by a line which rotates around axial line of rotation 10. This line is called a "generating line" in the present embodiment. In a cross-section of machine component 1 including axial line of rotation 10, generating line 1B corresponds to a line expressing a portion corresponding to rotation symmetry plane 1A.

The generating line of rotation symmetry plane 1A may be linear in this embodiment. In other words, rotation symmetry plane 1A may be a side surface of a column. A rotation symmetry plane of which generating line is linear like the side surface of the column is referred to as a "linear rotation plane" below. FIG. 1 and figures explained below mainly show examples of a linear rotation plane. The generating line of rotation symmetry plane 1A, however, may be any curve including an arc. The rotation symmetry plane of which generating line is any curve including an arc is referred to as a "curved rotation plane" below.

A type of machine component 1 is not particularly limited. In one embodiment, machine component 1 is a component in a drive system of a car.

Figure 2:
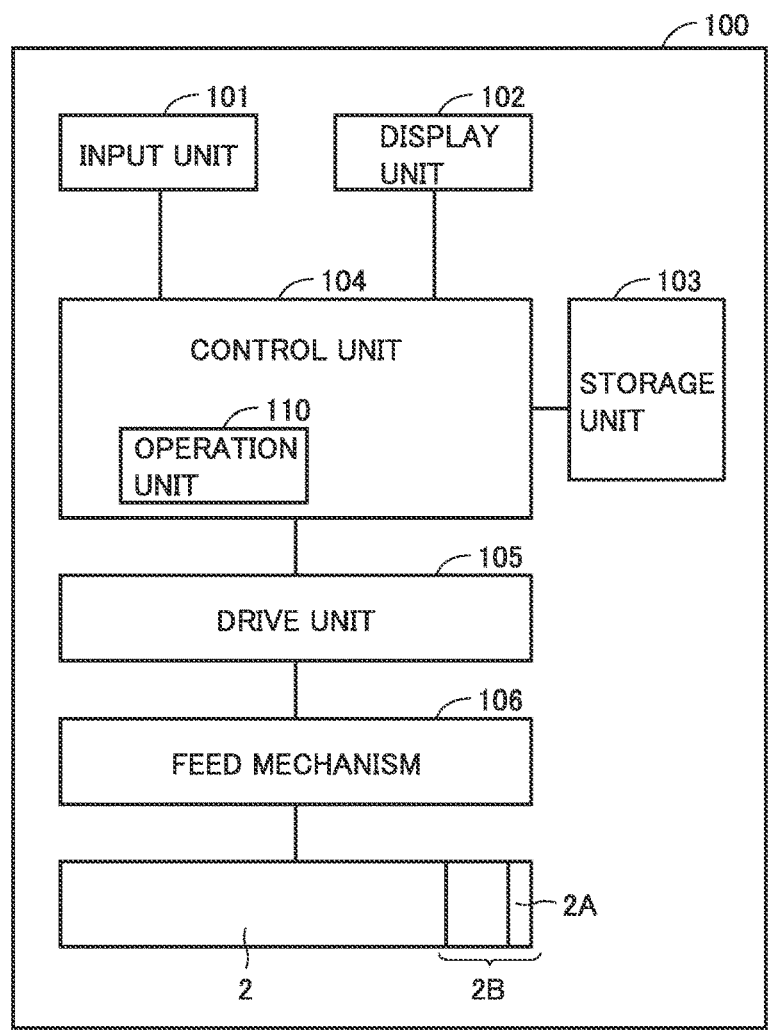
FIG. 2 is a block diagram schematically showing a configuration of a manufacturing apparatus according to one embodiment of the present invention.

FIG. 2 is a block diagram schematically showing a configuration of a manufacturing apparatus according to one embodiment of the present invention. A manufacturing apparatus 100 according to one embodiment of the present invention can be implemented, for example, by a computer numerical control (CNC) lathe. As shown in FIG. 2, manufacturing apparatus 100 includes an input unit 101, a display unit 102, a storage unit 103, a control unit 104, a drive unit 105, a feed mechanism 106, holder 2, and cutting insert 2B having cutting edge 2A.

Input unit 101 is operated by a user. Input unit 101 accepts information from the user and sends the information to control unit 104. The information from the user includes information on a program selected by the user, various types of data necessary for manufacturing machine component 1 (machining of a rotation symmetry plane), and a command from the user.

Display unit 102 shows characters, signs, and graphics. Display unit 102 can show information accepted by input unit 101 and a result of operation by control unit 104.

Storage unit 103 stores information accepted by input unit 101 and a program for manufacturing machine component 1. The program includes a program for machining a rotation symmetry plane. According to one embodiment, storage unit 103 is implemented by a rewritable non-volatile storage device. Therefore, storage unit 103 corresponds to a recording medium having a program recorded thereon. The program may be provided through a communication line. In this case as well, the program is stored in storage unit 103.

Control unit 104 is implemented by a computer configured to control manufacturing apparatus 100 in a centralized manner. Control unit 104 includes an operation unit 110. Operation unit 110 performs numeric operations based on information accepted by input unit 101 and information stored in storage unit 103. For example, operation unit 110 may be embodied as a result of execution of a program by a central processing unit (CPU).

Drive unit 105 drives feed mechanism 106. Drive unit 105 is controlled by control unit 104. Feed mechanism 106 is configured to be able to feed holder 2 in the direction of the X axis, the direction of the Y axis, and the direction of the Z axis.

Holder 2 holds cutting edge 2A by holding cutting insert 2B. Holder 2 is attached to feed mechanism 106. During machining of rotation symmetry plane 1A by cutting edge 2A, holder 2 is fixed to feed mechanism 106 so as not to be rotatable around an axis of rotation. Therefore, during machining of rotation symmetry plane 1A, holder 2 holds an angle of cutting edge 2A. During a period other than machining of rotation symmetry plane 1A (by way of example, during maintenance of manufacturing apparatus 100), holder 2 can rotate around the axis of rotation. Thus, maintenance of manufacturing apparatus 100 is advantageously facilitated.

Cutting edge 2A is formed by a ridgeline between a rake face and a flank of cutting insert 2B. In one embodiment of the present invention, the ridgeline is curved. Namely, cutting edge 2A is curved. In one example, cutting edge 2A is in an arc shape.

In another embodiment of the present invention, cutting edge 2A may be linear. The term "linear" herein means that a shape of cutting edge 2A is linear. A shape of cutting insert 2B for implementing the linear cutting edge is not particularly limited. In one embodiment, cutting insert 2B is in a triangular shape.

Figure 3:
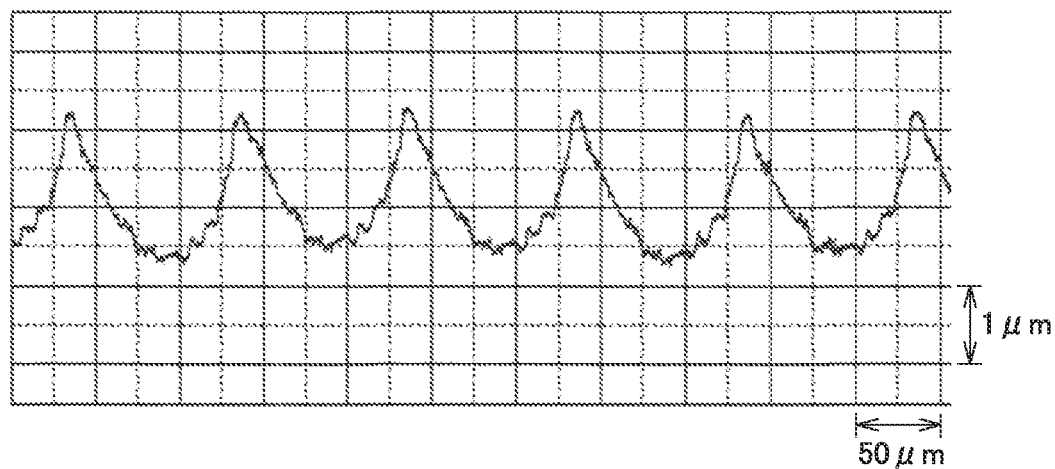
FIG. 3 is a graph showing surface roughness of a machined surface cut through point cutting.
Figure 4:
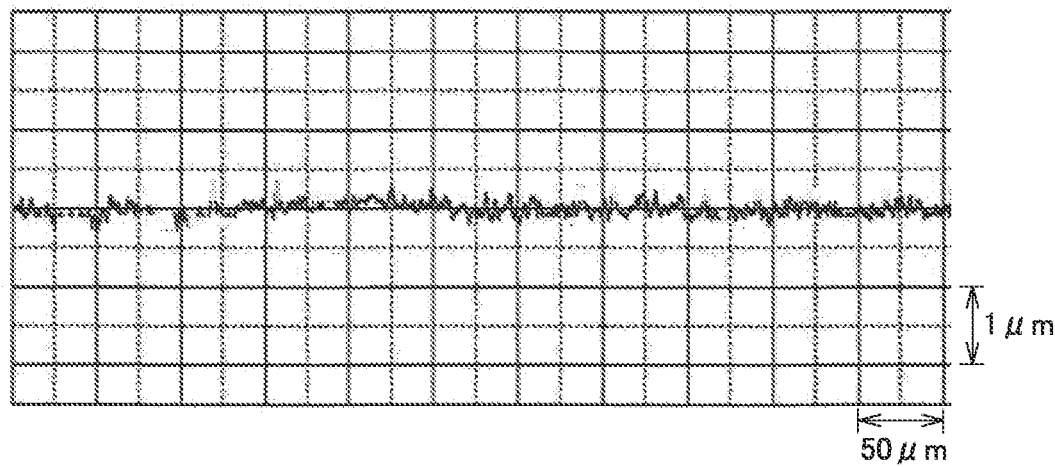
FIG. 4 is a graph showing surface roughness of a surface cut and machined in accordance with the manufacturing method according to the embodiment of the present invention.

The manufacturing method according to the embodiment of the present invention is more advantageous in surface roughness and efficiency than point cutting. FIG. 3 is a graph showing surface roughness of a machined surface cut through point cutting. FIG. 4 is a graph showing surface roughness of a surface cut and machined in accordance with the manufacturing method according to the embodiment of the present invention. Scales on the ordinate and the abscissa of the graphs in FIGS. 3 and 4 are the same.

As shown in FIGS. 3 and 4, the manufacturing method according to the embodiment of the present invention can be higher in accuracy of a machined surface (surface roughness) than point cutting while a rate of feed of the cutting edge is high. In point cutting, during a period from start of cutting to end of cutting, the same region of cutting edge 2A is in contact with the machined surface. Therefore, the cutting edge wears fast. According to the embodiment of the present invention, during a period from start of cutting until end of cutting, individual regions of linear cutting edge 2A successively come in contact with the machined surface. Wear is thus distributed over the entire cutting edge 2A. Therefore, lifetime of cutting edge 2A can be extended.

The manufacturing method according to the embodiment of the present invention, in particular, machining of a rotation symmetry plane, will be described in detail below.

1. Overview

Figure 5:
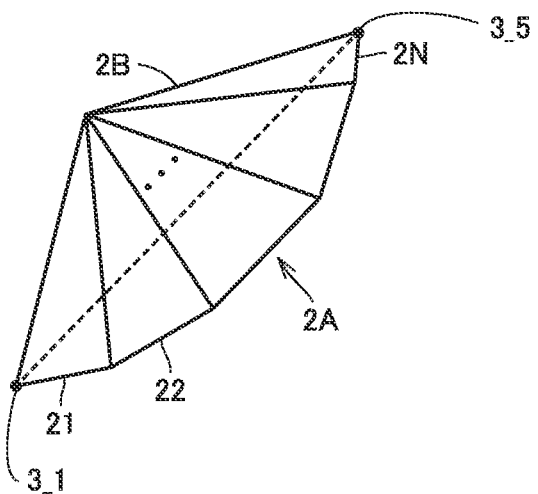
FIG. 5 is a schematic diagram of a cutting edge used in a machining method according to this embodiment.
Figure 6:
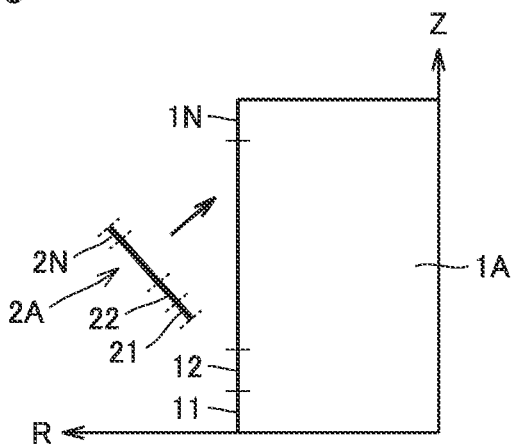
FIG. 6 is a schematic RZ plane diagram of a rotation symmetry plane machined with the machining method according to this embodiment.

FIG. 5 is a schematic diagram of a cutting edge used in a machining method according to this embodiment. FIG. 6 is a schematic RZ plane diagram of a rotation symmetry plane machined with the machining method according to this embodiment. The R axis refers to an axis in a direction of radius of rotation symmetry plane 1A.

Referring to FIGS. 5 and 6, cutting edge 2A of cutting insert 2B is virtually divided into N (N being an integer not smaller than 2) regions. The N regions are referred to as edges 21, 22, . . . , and 2N. Each of edges 21, 22, . . . , and 2N is linear. When cutting edge 2A is curved, the shape of cutting edge 2A is approximated by N line segments. When cutting edge 2A is in an arc shape, cutting edge 2A is virtually divided into N regions so as to divide a central angle of the arc into N equal parts. When cutting edge 2A is in a linear shape as shown with a dotted line in FIG. 5, a length of the cutting edge between a first end portion (tip end 3_1) of cutting edge 2A and a second end portion (rear end 3_5) of cutting edge 2A can be divided into N equal parts in order to form N regions.

N edges 21, 22, . . . , and 2N successively come in contact with rotation symmetry plane 1A. Rotation symmetry plane 1A is virtually divided into regions 11, 12, . . . , and 1N. An ith (i being an integer from 1 to N) edge of N edges cuts an ith region of the N regions.

Rotation symmetry plane 1A is machined with the entire cutting edge 2A. A part of cutting edge 2A can be prevented from being significantly worn as compared with other portions. Therefore, a lifetime of the insert can be longer. Furthermore, since rotation symmetry plane 1A is machined with the entire cutting edge 2A, accuracy of the machined surface can be higher (see FIG. 4).

2. Track of Cutting Edge (1) Use of Entire Cutting Edge

A track of cutting edge 2A is expressed with an XYZ coordinate system. A direction of each of the X axis, the Y axis, and the Z axis is defined as shown in FIG. 1.

Figure 7:
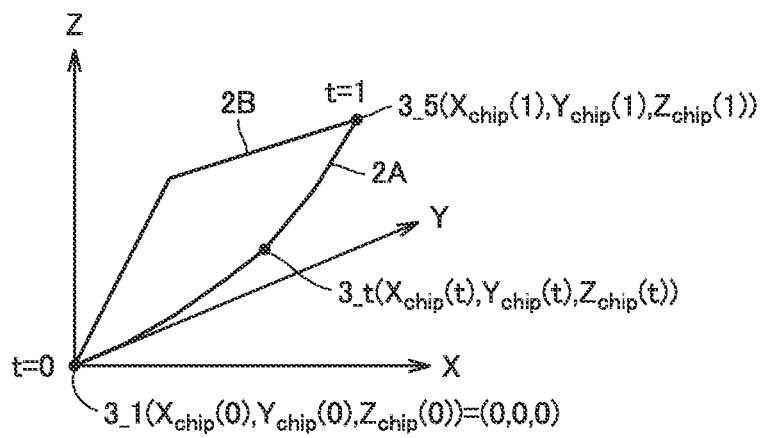
FIG. 7 is a diagram for illustrating a coordinate of a cutting edge.

FIG. 7 is a diagram for illustrating a coordinate of the cutting edge. Referring to FIG. 7, variable t is introduced. Variable t is a variable for expressing a degree of progress of cutting of a rotation symmetry plane by cutting edge 2A. Variable t is hereinafter referred to as a "cutting progress degree t." Cutting progress degree t assumes (N+1) values not smaller than 0 and not greater than 1. t=0 means start of cutting of a rotation symmetry plane. t=1 means end of cutting of the rotation symmetry plane. As shown in FIGS. 5 and 6, N edges 21, 22, . . . , and 2N successively come in contact with rotation symmetry plane 1A. Therefore, a position of point 3_t is varied in accordance with cutting progress degree t.

A coordinate of point 3_t is expressed as ($X_{chip}(t)$, $Y_{chip}(t)$, $Z_{chip}(t)$). ($X_{chip}(t)$, $Y_{chip}(t)$, $Z_{chip}(t)$) represents a relative coordinate with a position of tip end 3_1 of cutting edge 2A being defined as the reference. The coordinate ($X_{chip}(t)$, $Y_{chip}(t)$, $Z_{chip}(t)$) is dependent on a shape of cutting edge 2A, an angle of attachment of cutting edge 2A, and an angle of holder 2. The angle of attachment of cutting edge 2A corresponds to an inclination of cutting edge 2A with respect to the Z axis when cutting edge 2A is projected on the XZ plane. The angle of holder 2 corresponds to an inclination of cutting edge 2A with respect to the Z axis when cutting edge 2A is projected on the XY plane.

During cutting and machining, rotation of cutting insert 2B is suppressed by holder 2. Therefore, while cutting progress degree t is varied from κ to 1, a function representing each of $X_{chip}(t)$, $Y_{chip}(t)$, and $Z_{chip}(t)$ is not varied.

Figure 8:
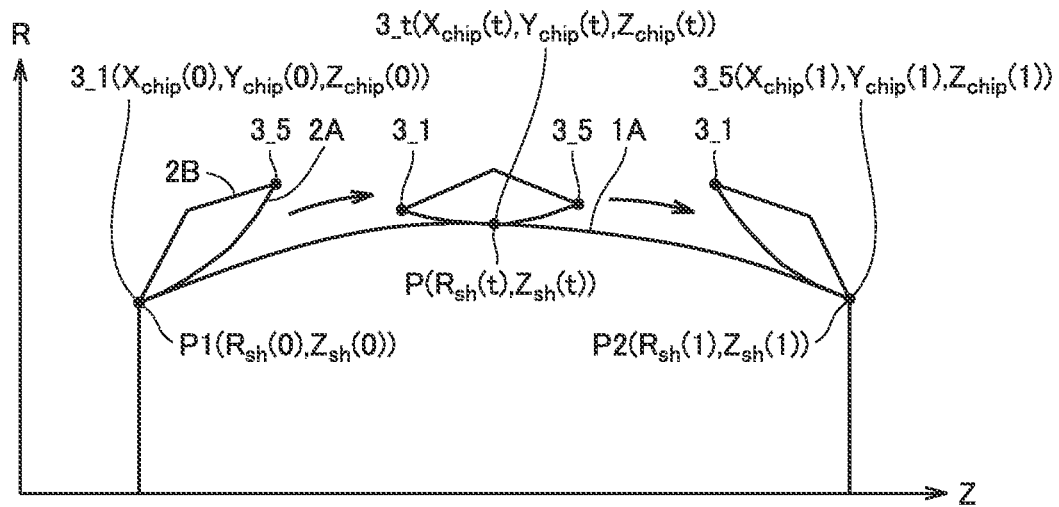
FIG. 8 is a diagram for illustrating the rotation symmetry plane machined with the cutting edge.

FIG. 8 is a diagram for illustrating the rotation symmetry plane machined with the cutting edge. As shown in FIG. 8, the R axis is the axis in the direction of radius of the rotation symmetry plane which is orthogonal to the Z axis. In the example shown in FIG. 8, rotation symmetry plane 1A is expressed with a curve on an RZ plane. As in the example shown in FIG. 6, however, rotation symmetry plane 1A may be a side surface of a column. In this case, rotation symmetry plane 1A on the RZ plane is expressed with a straight line.

In this embodiment, cutting and machining is performed from an outer end of rotation symmetry plane 1A toward an inner end of rotation symmetry plane 1A. With movement of cutting edge 2A, a position of a point of cutting P is varied. Therefore, a coordinate of point of cutting P can be expressed as a function dependent on cutting progress degree t.

A coordinate of point of cutting P is expressed as ($R_{sh}(t)$, $Z_{sh}(0)$). $R_{sh}(t)$ represents a radius of rotation symmetry plane 1A corresponding to a distance from a point on the Z axis (an axial line of rotation) (which is called the center of rotation) to point of cutting P. $Z_{sh}(t)$ represents a Z-axis coordinate of the center of rotation. Function $R_{sh}(t)$ and function $Z_{sh}(t)$ can properly be determined in accordance with rotation symmetry plane 1A.

Cutting edge 2A is fed while it is in contact with point of cutting P of rotation symmetry plane 1A. When a condition of t=0 is satisfied, tip end 3_1 (first end portion) of cutting edge 2A is positioned at a cutting start position P1 of rotation symmetry plane 1A. A position of point 3_t on cutting edge 2A is the same as the position of tip end 3_1 of cutting edge 2A.

When a condition of t=1 is satisfied, rear end 3_5 (second end portion) of cutting edge 2A is positioned at a cutting end position P2. A position of point 3_t on cutting edge 2A is the same as the position of rear end 3_5 (second end portion) of cutting edge 2A.

As shown in FIG. 8, a coordinate of tip end 3_1 of cutting edge 2A when the condition of t=0 is satisfied can be expressed as ($X_{chip}(0)$, $Y_{chip}(0)$, $Z_{chip}(0)$). On the track of cutting edge 2A, ($X_{chip}(0)$, $Y_{chip}(0)$, $Z_{chip}(0)$) is defined as the origin of the XYZ coordinate system. The coordinate of cutting start position P1 is expressed as ($R_{sh}(0)$, $Z_{sh}(0)$).

A coordinate of rear end 3_5 of cutting edge 2A when the condition of t=1 is satisfied can be expressed as ($X_{chip}(1)$, $Y_{chip}(1)$, $Z_{chip}(1)$). A coordinate of cutting end position P2 is expressed as ($R_{sh}(1)$, $Z_{sh}(1)$).

Generally, the coordinate of point 3_t on cutting edge 2A is expressed as ($X_{chip}(t)$, $Y_{chip}(t)$, $Z_{chip}(t)$). Cutting edge 2A is in contact with point of cutting P on rotation symmetry plane 1A at point 3_t. The coordinate of point of cutting P is expressed as ($R_{sh}(t)$, $Z_{sh}(0)$). $Z_{chip}(t)$ and $Z_{sh}(t)$, however, are different from each other. The reason is that Z-axis coordinate $Z_{chip}(t)$ of point 3_t is expressed as a relative coordinate, with a Z coordinate of tip end 3_1 of cutting edge 2A being defined as the reference.

(2) Condition for Machining of Rotation Symmetry Plane

Figure 9:
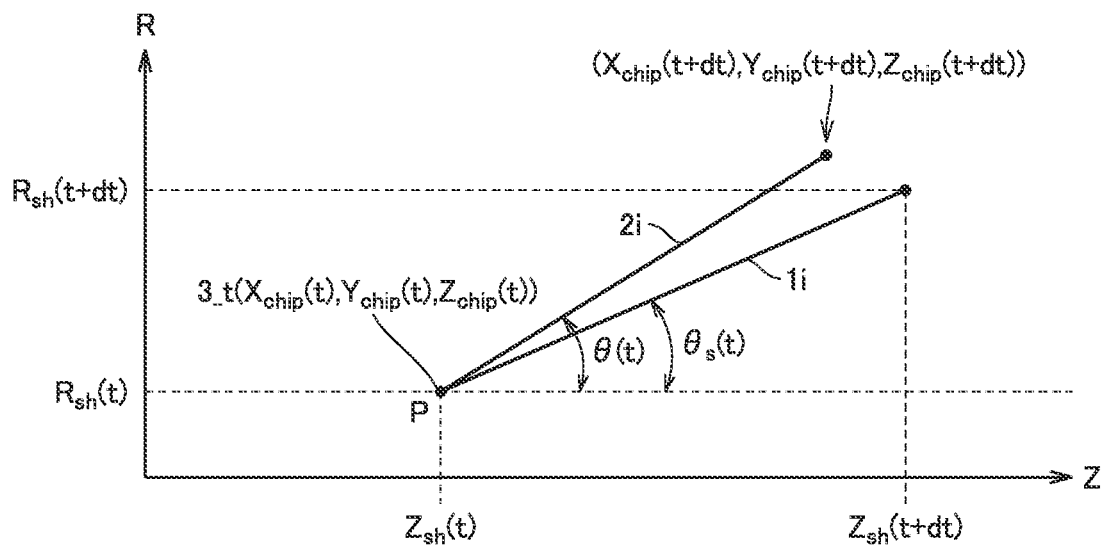
FIG. 9 is a model diagram in which a rotation symmetry plane 1A and a cutting edge 2A in the vicinity of a point of cutting are expressed on an XZ plane.
Figure 10:
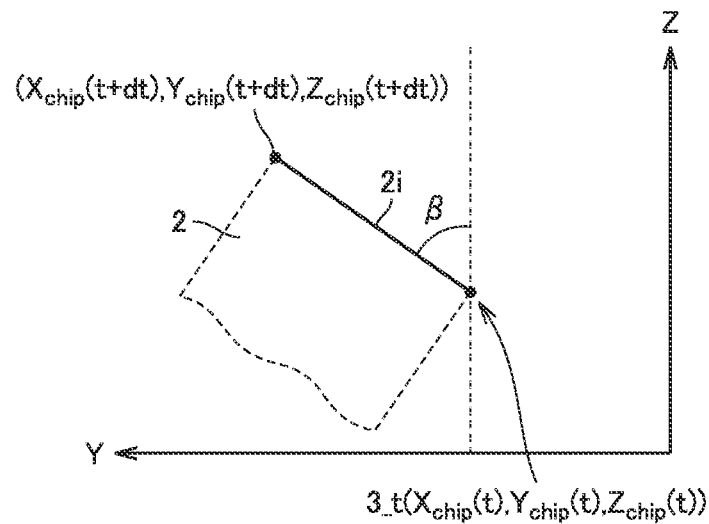
FIG. 10 is a model diagram in which rotation symmetry plane 1A and cutting edge 2A in the vicinity of the point of cutting are expressed on an XY plane.

In the embodiment of the present invention, the cutting edge is brought in contact with the rotation symmetry plane such that an angle of the cutting edge is equal to the angle of the rotation symmetry plane in a cross-section of the rotation symmetry plane including a point of cutting and an axial line of rotation. An error in cutting and machining can thus be lessened. An "angle of the cutting edge" and an angle of the "rotation symmetry plane" are angles with respect to the Z axis in the cross-section. FIG. 9 is a model diagram in which rotation symmetry plane 1A and cutting edge 2A in the vicinity of a point of cutting are expressed on the XZ plane. FIG. 10 is a model diagram in which rotation symmetry plane 1A and cutting edge 2A in the vicinity of the point of cutting are expressed on the XY plane. A position where rotation symmetry plane 1A and cutting edge 2A are in contact with each other corresponds to the point of cutting.

Referring to FIGS. 9 and 10, an edge 2i is the ith edge of the N edges of cutting edge 2A. A region 1i is the ith region of the N regions of rotation symmetry plane 1A. Edge 2i comes in contact with region 1i at point of cutting P. A position on edge 2i in contact with region 1i is expressed by point 3_t.

An angle $\theta_s(t)$ represents an inclination of region 1i projected on the RZ plane. Specifically, angle $\theta_s(t)$ is an angle representing an inclination of a tangent line which passes through point of cutting P and is in contact with region 1i projected on the RZ plane. The inclination of the tangent line corresponds to a ratio of a rate of change in the direction of the R axis to a rate of change in the direction of the Z axis. Therefore, angle $\theta_s(t)$ can be expressed in accordance with an expression below, where dt represents a rate of change in cutting progress degree t.

$$\tan \theta_s(t) = \frac{R_{sh}(t+dt) - R_{sh}(t)}{Z_{sh}(t+dt) - Z_{sh}(t)} = \frac{dR_{sh}}{dt}\left(\frac{dZ_{sh}}{dt}\right)^{-1} \quad (1)$$

Angle θ(t) represents an inclination of edge 2i projected on the XZ plane with respect to the X axis. Specifically, angle θ(t) represents an inclination of a tangent line which passes through point 3_t and is in contact with edge 2i projected on the XZ plane. The inclination of the tangent line corresponds to a ratio of a rate of change in the direction of the X axis with respect to a rate of change in the direction of the Z axis. Therefore, angle θ(t) can be expressed in accordance with an expression below. In the expression below, the R axis shown in FIG. 8 is assumed to be equal to the X axis.

$$\tan \theta(t) = \frac{dX_{chip}(t+dt) - dX_{chip}(t)}{dZ_{chip}(t+dt) - dZ_{chip}(t)} = \frac{dX_{chip}}{dt} \left( \frac{dZ_{chip}}{dt} \right)^{-1} \quad (2)$$

As shown in FIG. 10, an angle $\beta(t)$ of holder 2 can be expressed as an angle of a tangent line which passes through point 3_t and is in contact with edge 2i projected on the YZ plane. Angle $\beta(t)$ can also be defined as an angle of edge 2i. Angle $\beta(t)$ can be expressed in accordance with an expression below.

$$\tan \beta(t) = \frac{dY_{chip}(t+dt) - dY_{chip}(t)}{dZ_{chip}(t+dt) - dZ_{chip}(t)} = \frac{dY_{chip}}{dt} \left( \frac{dZ_{chip}}{dt} \right)^{-1} \quad (3)$$

Figure 11:
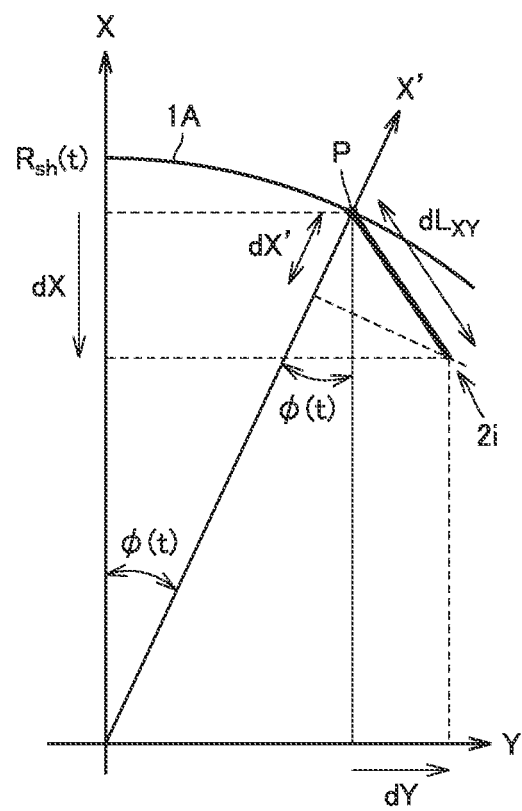
FIG. 11 is a diagram for illustrating an X-axis coordinate and a Y-axis coordinate of a point of cutting P.

FIG. 11 is a diagram for illustrating an X-axis coordinate and a Y-axis coordinate of point of cutting P. Referring to FIG. 11, when point of cutting P is projected on the XY plane, point of cutting P is located on a circumference having radius $R_{sh}(t)$ with the origin being defined as the center. An X' axis is an axis which connects the origin and point of cutting P to each other in the XY plane.

An angle of cutting $\phi(t)$ represents an angle formed by the X' axis with respect to the X axis on the XY plane. Angle of cutting $\phi(t)$ is dependent on t. With variation of t from 0 to 1, the X' axis pivots within the XY plane around the origin.

When edge 2i is projected on the XY plane, edge 2i is inclined with respect to the X axis by angle $\beta(t)$. A distance of a projected image of edge 2i on the X' axis from point of cutting P is denoted as dX'. A distance of a projected image of edge 2i on the X axis from point of cutting P is denoted as dX, and a distance of a projected image of edge 2i on the Y axis from point of cutting P is denoted as dY. In the example shown in FIG. 11, a condition of dX<0 and a condition of dY>0 are satisfied. dX', dX, and dY can be expressed in accordance with expressions below.

$$dX' = dX \cos \phi(t) + dY \sin \phi(t) \quad (4)$$

$$dX = dZ \tan \theta(t) \quad (5)$$

$$dY = dZ \tan \beta(t) \quad (6)$$

Figure 12:
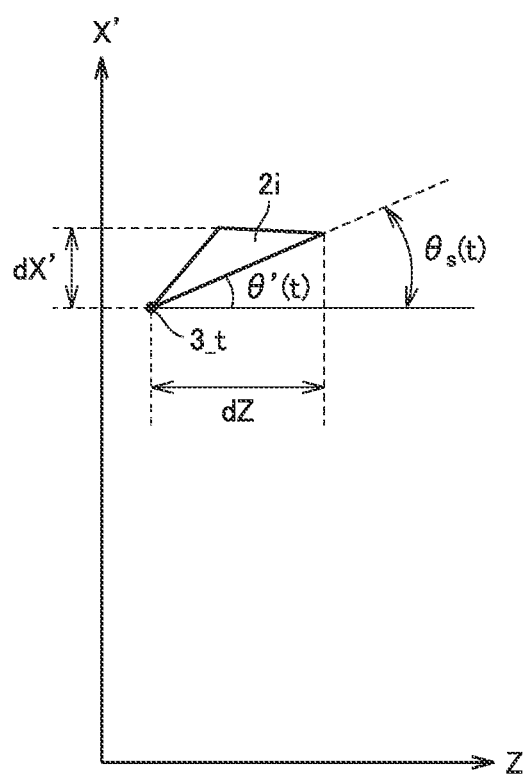
FIG. 12 is a diagram for illustrating the cutting edge projected on an X'Z plane.

FIG. 12 is a diagram for illustrating the cutting edge projected on an X'Z plane. Referring to FIG. 12, the X'Z plane is a plane including the Z axis and point of cutting P and it corresponds to a cut plane of rotation symmetry plane 1A (a cut plane of machine component 1). An angle formed by edge 2i projected on the X'Z plane with respect to the Z axis is denoted as $\theta'(t)$. Relation below is satisfied for angle $\theta'(t)$.

$$\frac{dX'}{dZ} = \tan \theta' \quad (7)$$

In order to machine rotation symmetry plane 1A to a target shape, edge 2i should be fed such that an inclination of rotation symmetry plane 1A at point of cutting P attains to a target inclination (angle $\theta_s(t)$) on the cut plane (the X'Z plane). On the cut plane, the inclination of edge 2i at point of cutting P should be equal to the target inclination of rotation symmetry plane 1A at point of cutting P. Namely, relation of $\theta'(t) = \theta_s(t)$ is satisfied.

An expression below is derived from the expression (7) and relation of $\theta'(t) = \theta_s(t)$.

$$\tan \theta'(t) = \frac{dX'}{dZ} = \frac{dX}{dZ} \cos \phi(t) + \frac{dY}{dZ} \sin \phi(t) = \tan \theta_s(t) \quad (8)$$

$$\tan \theta(t) \cdot \cos \phi(t) + \tan \beta_s(t) \cdot \sin \phi(t) = \tan \theta_s(t) \quad (9)$$

An expression (10) below is derived by transforming the expressions (8) and (9) above.

$$\tan \phi(t) = \frac{\tan \beta \cdot \tan \theta_s - \tan \theta \cdot \sqrt{\tan^2 \theta + \tan^2 \beta - \tan^2 \theta_s}}{\tan \theta \cdot \tan \theta_s + \tan \beta \cdot \sqrt{\tan^2 \theta + \tan^2 \beta - \tan^2 \theta_s}} \quad (10)$$

Angle of cutting $\phi(t)$ is determined to satisfy the relation expressed in the expression (10) above while t is varied from 0 to 1. Thus, such a state that the inclination (first inclination) of the tangent line of the cutting edge at point of cutting P is equal to the target inclination (second inclination) of rotation symmetry plane 1A at point of cutting P in the cut plane (X'Z plane) of rotation symmetry plane 1A during a period from start of cutting until end of cutting is maintained.

As set forth above, cutting edge 2A is virtually divided into N linear edges. Therefore, the inclination of the tangent line of the cutting edge at point of cutting P can be substituted with the inclination of the cutting edge (edge 2i) at point of cutting P.

Figure 13:
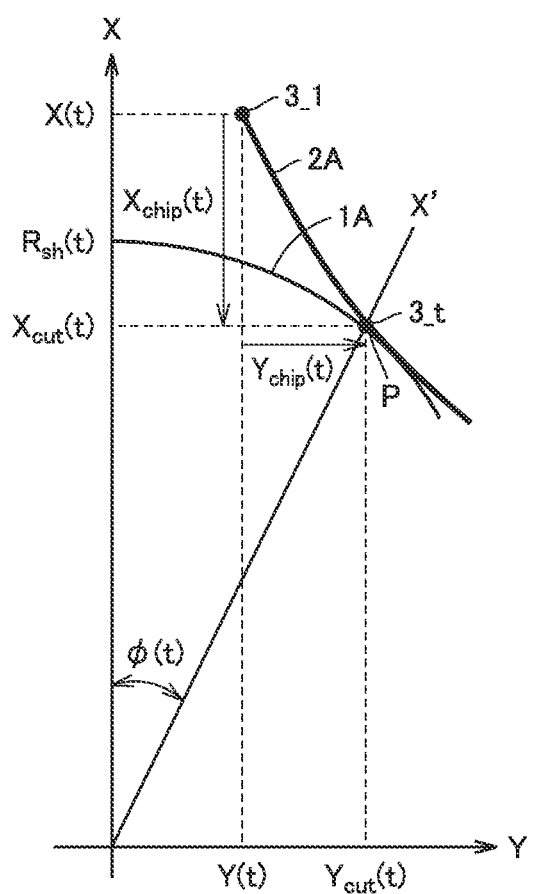
FIG. 13 is an XY plane diagram for illustrating relation between the point of cutting on the rotation symmetry plane and a tip end of the cutting edge.

FIG. 13 is an XY plane diagram for illustrating relation between the point of cutting on the rotation symmetry plane and the tip end of the cutting edge. Referring to FIG. 13, a distance from the origin to point of cutting P on the X' axis is expressed as $R_{sh}(t)$. The X' axis forms angle $\phi(t)$ with respect to the X axis.

Figure 14:
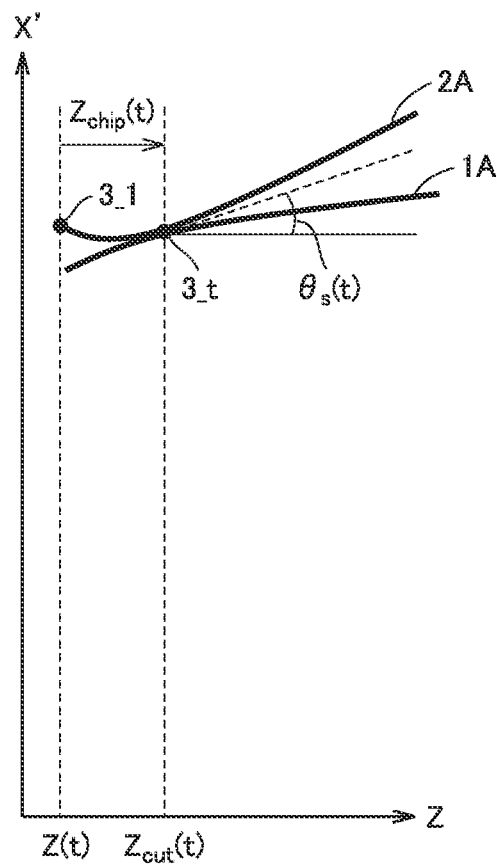
FIG. 14 is an X'Z plane diagram for illustrating relation between the point of cutting on the rotation symmetry plane and the tip end of the cutting edge.

FIG. 14 is an X'Z plane diagram for illustrating relation between the point of cutting on the rotation symmetry plane and the tip end of the cutting edge. Referring to FIG. 14, a Z-axis coordinate of point of cutting P is expressed as $Z_{sh}(t)$.

A three-dimensional coordinate $(X_{cut}(t), Y_{cut}(t), Z_{cut}(t))$ of point of cutting P can be expressed in accordance with expressions below.

$$X_{cut} = R_{sh}(t) \cos \phi(t) \quad (11)$$

$$Y_{cut} = R_{sh}(t) \sin \phi(t) \quad (12)$$

$$Z_{cut}(t) = Z_{sh}(t) \quad (13)$$

A coordinate of tip end 3_1 of cutting edge 2A can be expressed as $(X_{chip}(t), Y_{chip}(t), Z_{chip}(t))$ with a position of point 3_t of cutting edge 2A being defined as the reference. A position of point 3_t of cutting edge 2A is the same as a position of point of cutting P. Based on the expressions (11), (12), and (13), a coordinate $(X(t), Y(t), Z(t))$ of tip end 3_1 of cutting edge 2A can be expressed in accordance with expressions below.

$$X(t) = R_{sh}(t) \cos \phi(t) - X_{chip}(t) \quad (14)$$

$$Y(t) = R_{sh}(t) \sin \phi(t) - Y_{chip}(t) \quad (15)$$

$$Z(t) = Z_{sh}(t) - Z_{chip}(t) \quad (16)$$

As set forth above, a coordinate (X(t), Y(t), Z(t)) of tip end 3_1 of cutting edge 2A is derived from such a condition that the inclination (first inclination) of the tangent line of cutting edge 2A at the point of cutting is equal to the target inclination (second inclination) of the tangent line of rotation symmetry plane 1A at the point of cutting in the cut plane of rotation symmetry plane 1A which passes through the Z axis and point of cutting P. The rotation symmetry plane can thus be machined in conformity with the target shape.

(3) Determination of Track

Figure 15:
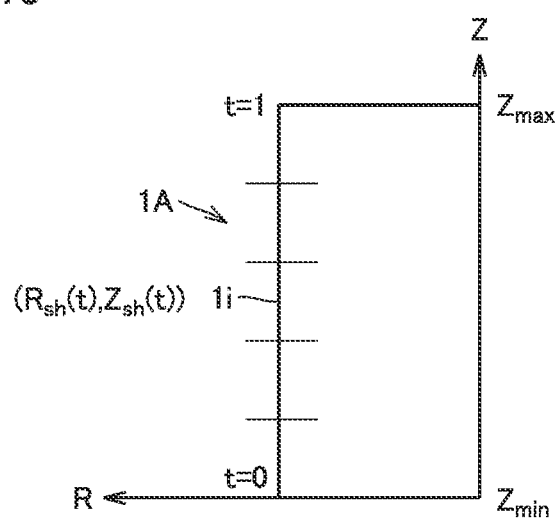
FIG. 15 is a diagram for illustrating a coordinate of a section of rotation symmetry plane 1A.

FIG. 15 is a diagram for illustrating a coordinate of a section of rotation symmetry plane 1A. As shown in FIG. 15, rotation symmetry plane 1A is a side surface of a column, and hence rotation symmetry plane 1A is expressed as a straight line on the RZ plane. A rate of change in t is expressed as 1/N with N being an integer not smaller than 2. t varies from $t_0$ to $t_N$. Rotation symmetry plane 1A is virtually divided into N regions. An R-axis coordinate $R_{sh}(i)$ and a Z-axis coordinate $Z_{sh}(i)$ of a position of a section in ith region 1i can be expressed in accordance with expressions (17) and (18) below. R represents a radius of a column. R is a fixed value.

$$R_{sh}(i)=R \qquad (17)$$

$$Z_{sh}(i)=(Z_{max}-Z_{min})\times i/N \qquad (18)$$

Angles $\theta(t)$, $\theta_s(t)$, $\beta(t)$, and $\phi(t)$ can be calculated with a method below.

Figure 16:
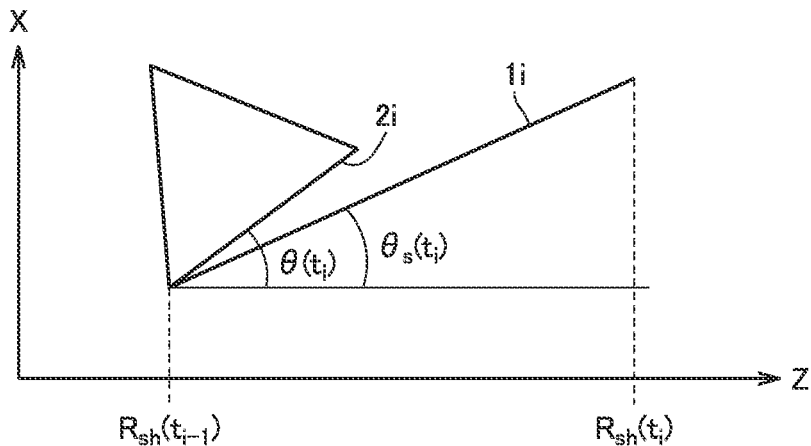
FIG. 16 is a diagram showing an angle used for calculation of a track of the cutting edge.

FIG. 16 is a diagram showing an angle used for calculation of the track of the cutting edge. Referring to FIG. 16, edge 2i forms an angle $\theta(t_i)$ with respect to the X axis on the XZ plane. Region 1i forms an angle $\theta s(t_i)$ with respect to the X axis on the XZ plane. A range of X-axis coordinates of region 1i is from $R_{sh}(t_{i-1})$ to $R_{sh}(t_i)$. A value for $R_{sh}(t_i)$ is smaller than $R_{sh}(t_{i-1})$.

Local angles $\theta_s(t_i)$, $\theta(t_i)$, and $\beta(t_i)$ are found based on the expression (1) to the expression (3), in accordance with expressions (19) to (21) below.

$$\tan\theta(t_i) = \frac{X_{chip}(t_i) - X_{chip}(t_{i-1})}{Z_{chip}(t_i) - Z_{chip}(t_{i-1})} \qquad (19)$$

$$\tan\theta_s(t_i) = \frac{R_{sh}(t_i) - R_{sh}(t_{i-1})}{Z_{sh}(t_i) - Z_{sh}(t_{i-1})} \qquad (20)$$

$$\tan\beta(t_i) = \frac{Y_{chip}(t_i) - Y_{chip}(t_{i-1})}{Z_{chip}(t_i) - Z_{chip}(t_{i-1})} \qquad (21)$$

Local angles $\theta_s(t_i)$, $\theta(t_i)$, and $\beta(t_i)$ for each of $t_i$ to $t_N$ are approximately found based on the expressions (19) to (21), by using (N+1) points $t_0$, $t_1$, ..., and $t_N$. Angle $\phi(t)$ for each $t_i$ of $t_i$ to $t_N$ can be found from $\theta_s(t_i)$, $\theta(t_i)$, and $\beta(t_i)$.

With the method described above, $R_{sh}(t)$, $Z_{sh}(t)$, $\phi(t)$, $X_{chip}(t)$, $Y_{chip}(t)$, and $Z_{chip}(t)$ can be obtained at each point of $t_0$ to $t_N$. Therefore, a track of tip end 3_1 of cutting edge 2A can be calculated based on the expressions (14) to (16).

3. Manufacturing Method

Figure 17:
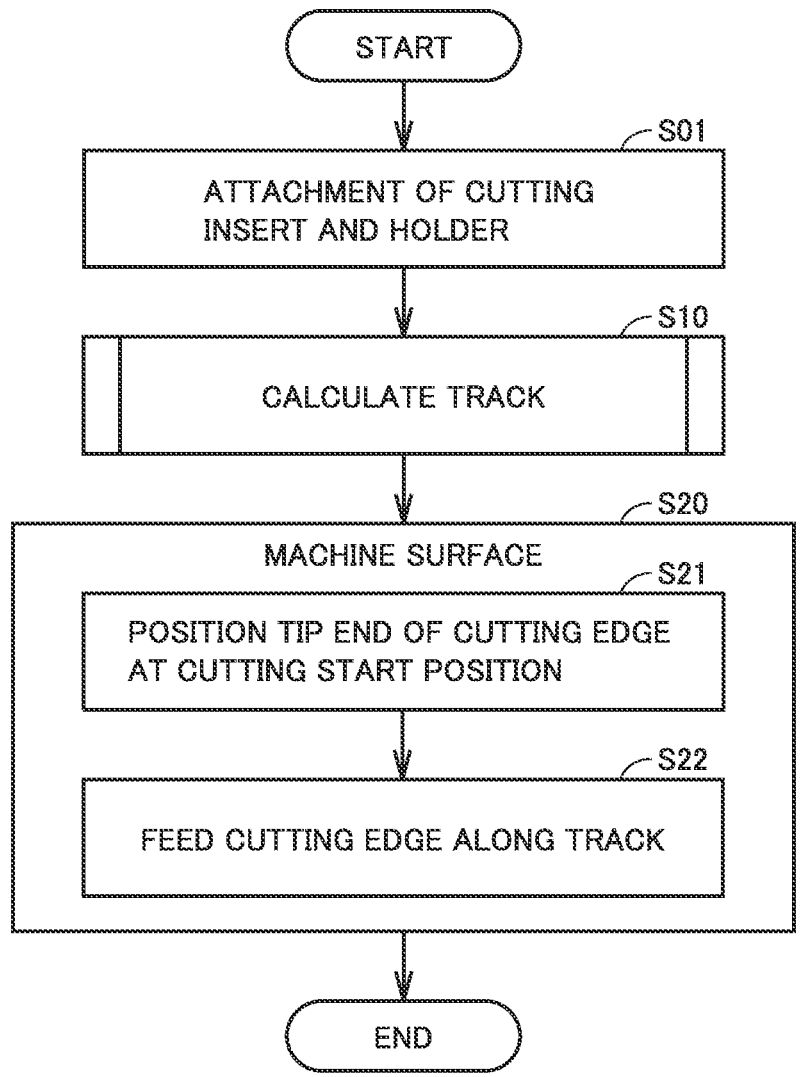
FIG. 17 is a flowchart showing a method for manufacturing a machine component according to the embodiment of the present invention.

FIG. 17 is a flowchart showing a method for manufacturing a machine component according to the embodiment of the present invention. As shown in FIG. 17, in step S01, cutting insert 2B is attached to holder 2. Holder 2 is attached to manufacturing apparatus 100 (feed mechanism 106).

In step S10, a track of tip end 3_1 of cutting edge 2A is calculated. In step S20, cutting edge 2A machines rotation symmetry plane 1A. Processing in steps S10 and S20 is performed as control unit 104 reads a program stored in storage unit 103.

Processing in step S20 will be described in detail. Initially, control unit 104 positions tip end 3_1 of cutting edge 2A at a cutting start position (step S21). Then, control unit 104 feeds cutting edge 2A such that a three-dimensional coordinate (X(t), Y(t), Z(t)) of tip end 3_1 of cutting edge 2A is varied in accordance with ($R_{sh}(t)\cos\phi(t)-X_{chip}(t)$, $R_{sh}(t)\sin\phi(t)Y_{chip}(t)$, $Z_{sh}(t)-Z_{chip}(t)$) (step S22). In step S22, control unit 104 varies variable t (cutting progress degree) from $t_0$ (=0) to $t_N$ (=1). Each time t is varied, control unit 104 moves cutting edge 2A such that the coordinate of tip end 3_1 of cutting edge 2A is equal to the coordinate calculated in step S10.

In second and subsequent machining, processing in step S20 is repeated. Control unit 104 performs processing in steps S21 and S22.

After step S20 or before step S01, a further step necessary for manufacturing machine component 1 may be performed. For example, an inspection step for inspecting machine component 1 may be performed after step S20.

Figure 18:
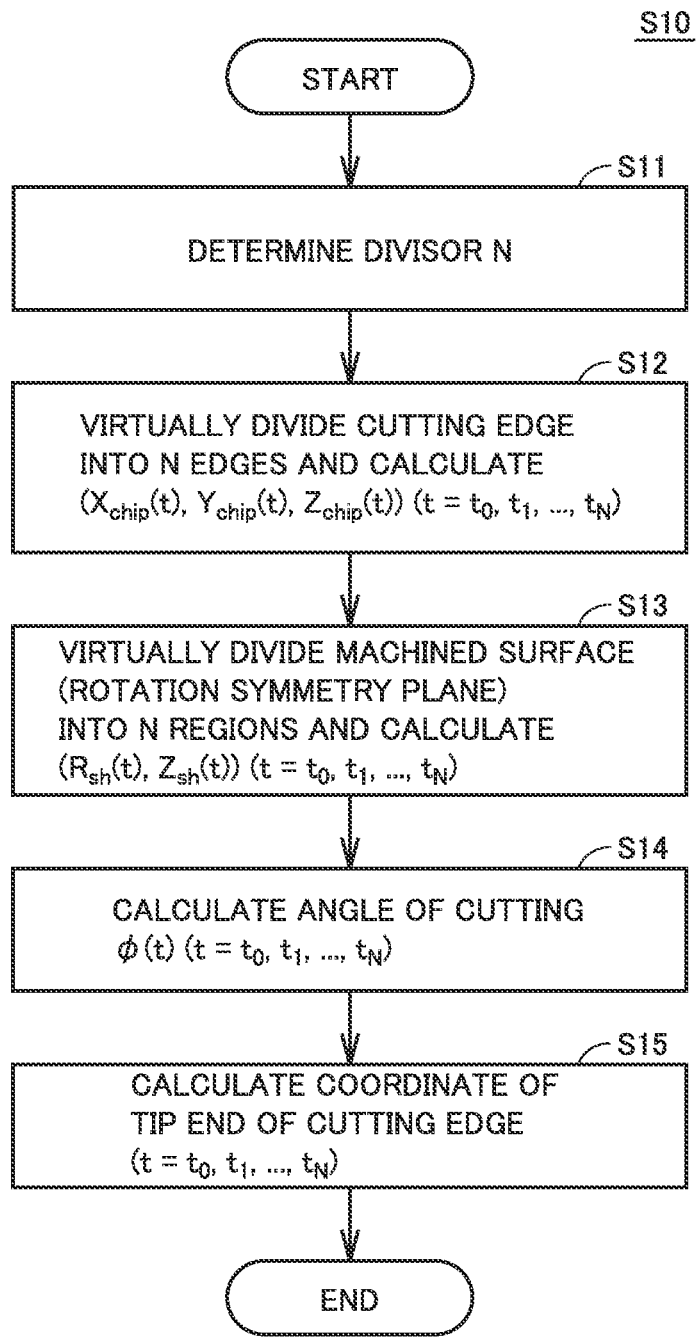
FIG. 18 is a flowchart showing details of processing for calculating a track shown in FIG. 17.

FIG. 18 is a flowchart showing details of processing for calculating a track shown in FIG. 17. This processing is performed by operation unit 110 shown in FIG. 2. As shown in FIG. 18, in step S11, operation unit 110 determines divisor N. For example, N can be determined such that an amount of feed of cutting edge 2A is set to a minimum value determined by restrictions imposed on manufacturing apparatus 100.

In processing in steps S12 to S15, a coordinate ($X_{chip}(t)$, $Y_{chip}(t)$, $Z_{chip}(t)$) of point 3_t of cutting edge 2A, a coordinate ($R_{sh}(t)$, $Z_{sh}(t)$) of point of cutting P, and angle $\phi(t)$ at each point of $t=t_0$ to $t_N$ are calculated in accordance with the method described above. Values which have already been known in designing machine component 1 such as values for R, $\theta_s$, and $\beta$ and a coordinate of a point O are input to operation unit 110 through input unit 101.

In step S12, operation unit 110 virtually divides cutting edge 2A into N edges and calculates a coordinate ($X_{chip}(t)$, $Y_{chip}(t)$, $Z_{chip}(t)$) of point 3_t of cutting edge 2A at each point of $t=t_0$ to $t_N$.

In step S13, operation unit 110 virtually divides the machined surface (rotation symmetry plane 1A) into N regions and calculates a coordinate ($R_{sh}(t)$, $Z_{sh}(t)$) of point of cutting P at each point of $t=t_0$ to $t_N$. When a side surface of a column is adopted as the rotation symmetry plane, $R_{sh}(t)=R$ (constant) is set.

In step S14, operation unit 110 calculates angle $\phi(t)$ at each point of $t=t_0$ to $t_N$.

In step S15, operation unit 110 calculates a coordinate of tip end 3_1 of cutting edge 2A at each point of $t=t_0$ to $t_N$ by using $R_{sh}(t)$, $Z_{sh}(t)$, $X_{chip}(t)$, $Y_{chip}(t)$, and $Z_{chip}(t)$. A position on the track of tip end 3_1 of cutting edge 2A is thus calculated. As processing in step S15 ends, processing in step S10 ends.

Limitation to such processing that step S20 shown in FIG. 16 is performed in succession to step S10 is not intended. Processing for calculating a track in step S10 may be performed independently of processing in step S20. A computer which performs processing in step S10 may be a computer provided outside manufacturing apparatus 100.

4. Example of Machining Method (1) Curved Cutting Edge-Linear Rotation Plane

Figure 19:
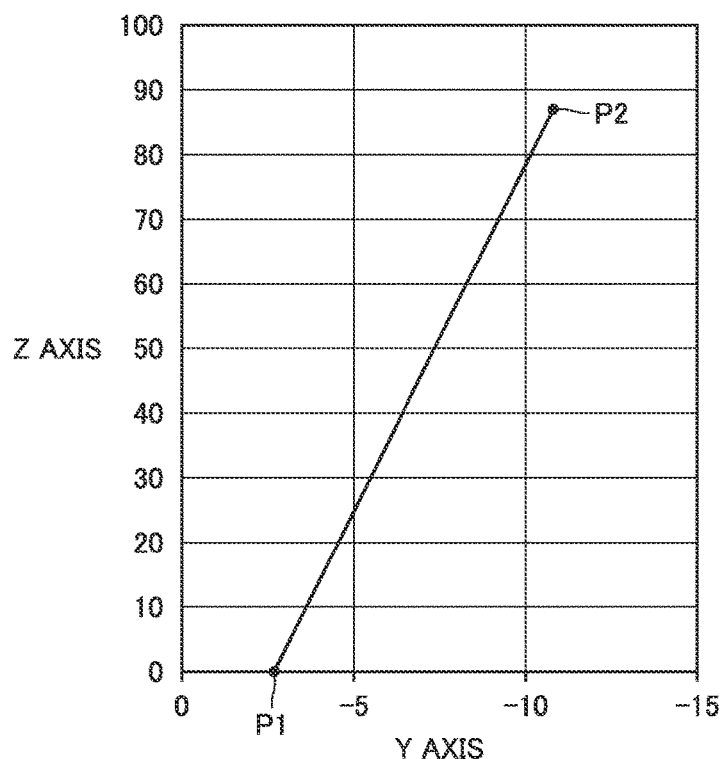
FIG. 19 is a diagram showing a result of calculation of a track of a tip end of a cutting edge in machining a linear rotation plane with a curved cutting edge.
Figure 20:
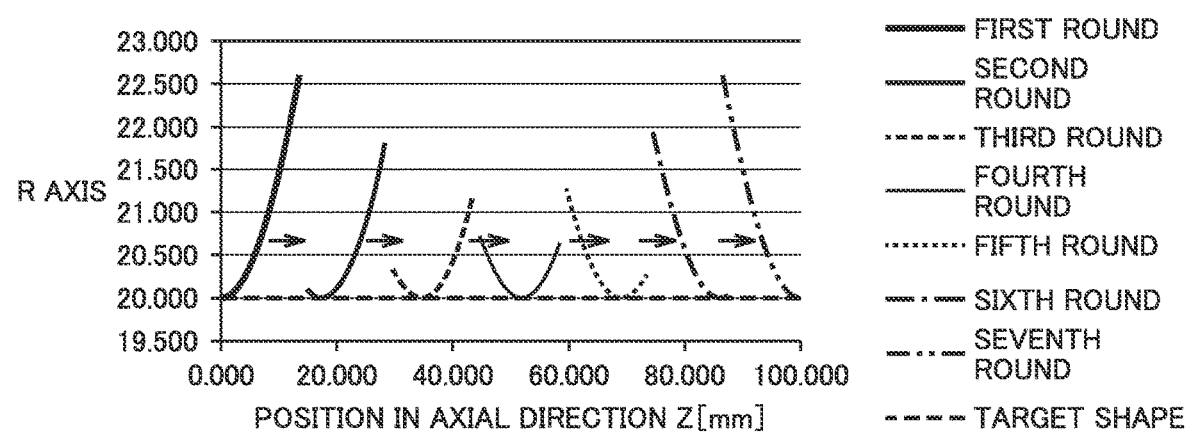
FIG. 20 is a diagram showing a result of calculation of machining of the linear rotation plane with the curved cutting edge.

FIG. 19 is a diagram showing a result of calculation of a track of the tip end of the cutting edge in machining a linear rotation plane with a curved cutting edge. FIG. 20 is a diagram showing a result of calculation of machining of the linear rotation plane with the curved cutting edge. A unit for a numeric value in the graph described below is not particularly limited. The unit is mm by way of example.

As shown in FIG. 19, cutting start position P1 is a position offset from the origin in the XYZ coordinate system in the negative direction of the Y axis. The tip end of the cutting edge draws a track from cutting start position P1 toward the negative direction of the Y axis and the positive direction of the Z axis and reaches cutting end position P2.

Each of a plurality of curves shown in FIG. 20 shows a position of cutting edge 2A on the RZ plane when cutting edge 2A is fed in the positive direction of the Z axis at a constant pitch while machine component 1 (column) is rotated. For facilitating understanding, FIG. 20 shows an example in which the cutting edge is fed at a pitch of 15 mm/rev (15 mm per one rotation). In this example, the column has a radius of 20 mm and a height (a length of a machined portion in the direction of the Z-axis) of 100 mm.

Cutting edge 2A has an arc shape, a length of 19 mm, and a radius of curvature of 100 mm.

An angle of inclination β of holder 2 is at 45 degrees and an angle of attachment θ of cutting edge 2A is at 0 degree. Angle of inclination β is an angle of cutting edge 2A projected on the YZ plane with respect to the Z axis. Angle of attachment θ is an angle of cutting edge 2A projected on the XZ plane with respect to the Z axis. An angle formed by a straight line connecting the tip end and the rear end of cutting edge 2A to each other with respect to the Z axis on the XZ plane is denoted with θ.

A dashed line indicated as "target shape" represents a target shape of rotation symmetry plane 1A. An envelope of a plurality of curves each representing cutting edge 2A corresponds to an actually machined shape. As shown in FIG. 20, the envelope of the plurality of curves matches with the dashed line indicated as the "target shape." It can be understood in FIG. 20 that the envelope which envelops the plurality of curves representing cutting edge 2A matches with the dashed line indicated as the "target shape" also when cutting edge 2A is fed at a finer pitch. According to the embodiment of the present invention, the side surface of the column can be machined accurately (that is, as dimensioned) with the curved cutting edge.

(2) Linear Cutting Edge-Curved Rotation Plane

Figure 21:
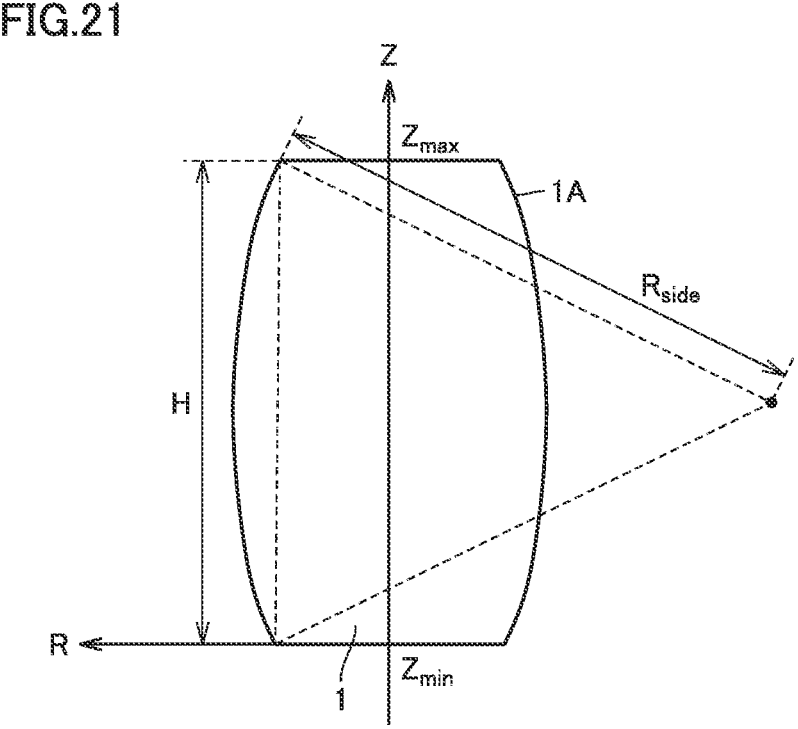
FIG. 21 is a diagram showing a first example of a curved rotation plane.
Figure 22:
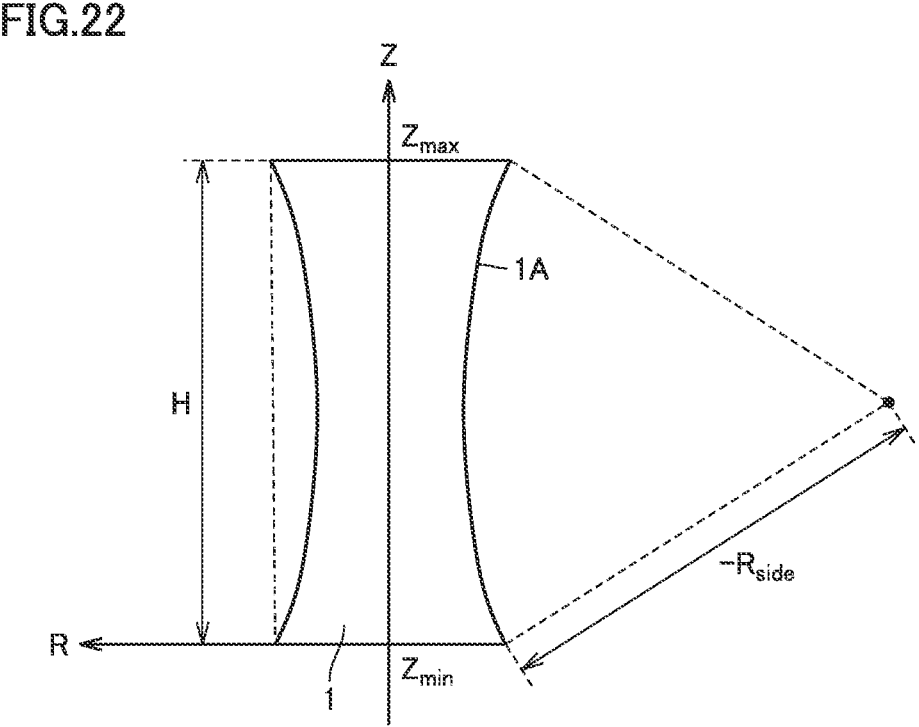
FIG. 22 is a diagram showing a second example of the curved rotation plane.

FIG. 21 is a diagram showing a first example of the curved rotation plane. FIG. 22 is a diagram showing a second example of the curved rotation plane. As shown in FIGS. 21 and 22, rotation symmetry plane 1A is expressed as a curve on the RZ plane. The curve has a radius of curvature $R_{side}$.

In the example shown in FIG. 21, rotation symmetry plane 1A projects in the positive direction of the R axis. In the example shown in FIG. 22. rotation symmetry plane 1A is recessed in the positive direction of the R axis. Therefore, in the example shown in FIG. 22, a radius of curvature of rotation symmetry plane 1A is expressed as $-R_{side}$. In any of examples in FIGS. 21 and 22, rotation symmetry plane 1A has a height H along the direction of the Z axis, and a length of machine component 1 in the direction of the R axis at $Z=Z_{max}$ and $Z=Z_{min}$ corresponds to a radius of the column (that is, constant R).

Figure 23:
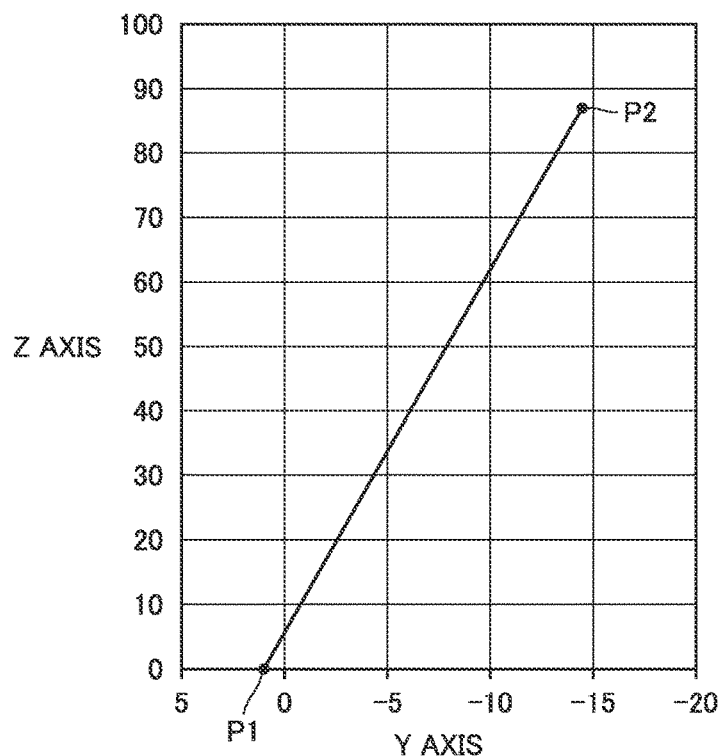
FIG. 23 is a diagram showing a result of calculation of a track of a tip end of a cutting edge in machining a curved rotation plane with a linear cutting edge.
Figure 24:
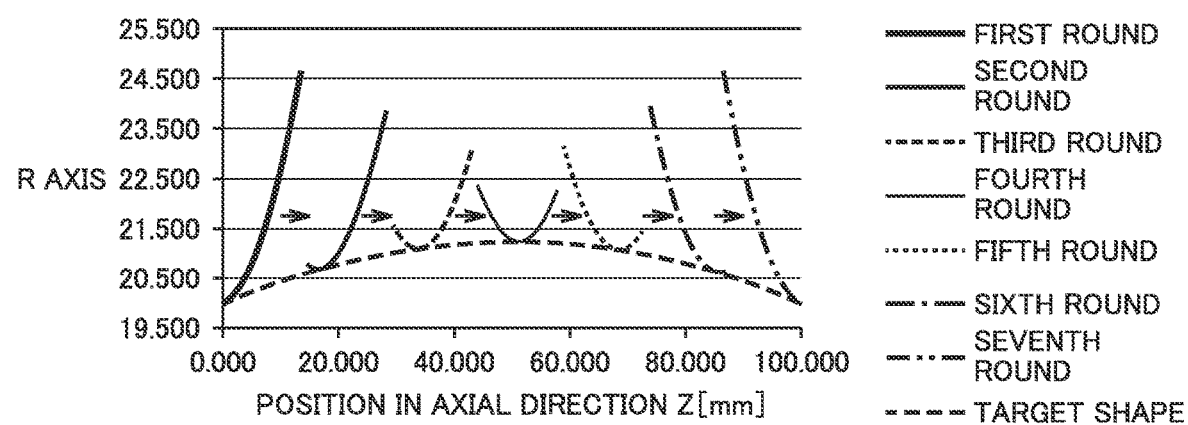
FIG. 24 is a diagram showing a result of calculation of machining of the curved rotation plane with the linear cutting edge.

FIGS. 23 and 24 representatively show results of calculation of machining of the curved rotation plane shown in FIG. 21. FIG. 23 is a diagram showing a result of calculation of a track of the tip end of the cutting edge in machining the curved rotation plane with a linear cutting edge. FIG. 24 is a diagram showing a result of calculation of machining of the curved rotation plane with the linear cutting edge.

As shown in FIG. 23, cutting start position P1 is a position offset from the origin in the XYZ coordinate system in the positive direction of the Y axis. The tip end of the cutting edge draws a track from cutting start position P1 toward the negative direction of the Y axis and the positive direction of the Z axis and reaches cutting end position P2. $R_{side}$=100 mm is set. Conditions other than cutting edge 2A being linear are the same as the conditions for obtaining the results of calculation shown in FIGS. 19 and 20.

As shown in FIG. 24, an envelope of a plurality of curves matches with the dashed line indicated as the "target shape." According to the embodiment of the present invention, the curved rotation plane can accurately be machined with the linear cutting edge.

(3) Curved Cutting Edge-Curved Rotation Plane

Figure 25:
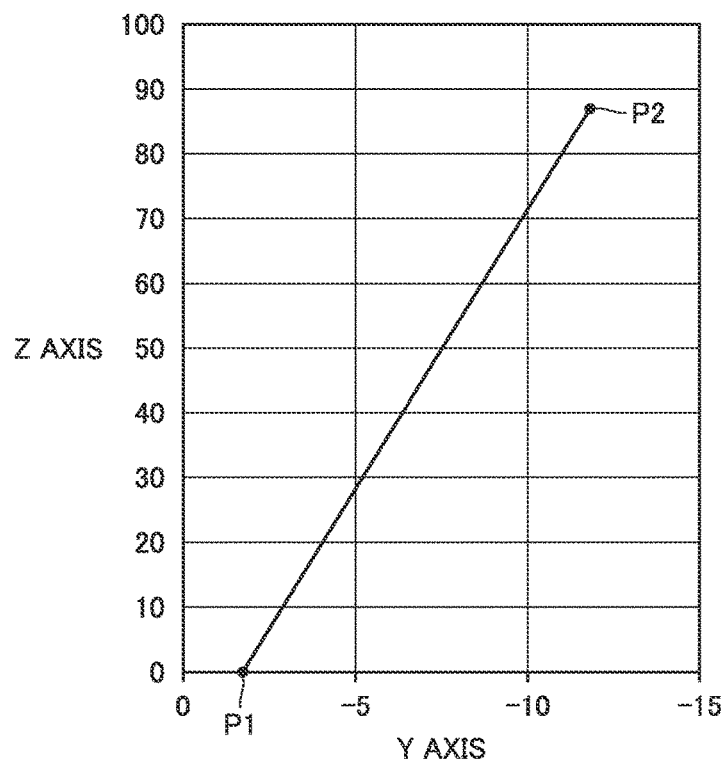
FIG. 25 is a diagram showing a result of calculation of a track of a tip end of a cutting edge in machining a curved rotation plane with a curved cutting edge.
Figure 26:
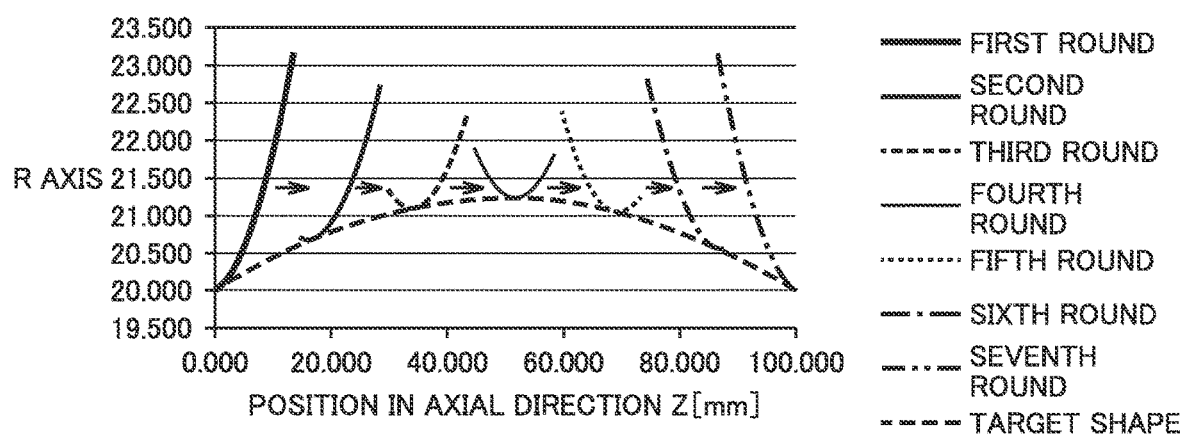
FIG. 26 is a diagram showing a result of calculation of machining of the curved rotation plane with a curved cutting edge.

FIGS. 25 and 26 show results of calculation of machining with a curved cutting edge, of the curved rotation plane shown in FIG. 21. FIG. 25 is a diagram showing a result of calculation of a track of the tip end of the cutting edge in machining the curved rotation plane with the curved cutting edge. FIG. 26 is a diagram showing a result of calculation of machining of the curved rotation plane with the curved cutting edge.

As shown in FIG. 25, cutting start position P1 is a position offset from the origin in the XYZ coordinate system in the negative direction of the Y axis. The tip end of the cutting edge draws a track from cutting start position P1 toward the negative direction of the Y axis and the positive direction of the Z axis and reaches cutting end position P2. Conditions of cutting edge 2A are the same as the conditions for obtaining the results of calculation shown in FIGS. 19 and 20. Conditions of the curved rotation plane are the same as the conditions of the curved rotation plane for obtaining the results of calculation shown in FIG. 24.

As shown in FIG. 26, an envelope of a plurality of curves matches with the dashed line indicated as the "target shape." According to the embodiment of the present invention, the curved rotation plane can accurately be machined with the curved cutting edge.

According to the embodiment of this invention, the rotation symmetry plane can be machined with the curved cutting edge or the linear cutting edge. A side surface of a column is adopted as the rotation symmetry plane. In this embodiment, the "side surface of the column" includes a rotation symmetry plane of which projected image on the YZ plane or the XZ plane is linear or curved.

Directions of the X axis, the Y axis, and the Z axis are not limited as shown in each drawing. The positive direction of each of the X axis, the Y axis, and the Z axis may be opposite to the orientation shown in the drawings.

An embodiment of the present invention is applicable also to machining of a workpiece without being limited to a machine component.

It should be understood that the embodiments disclosed herein are illustrative and non-restrictive in every respect. The scope of the present invention is defined by the terms of the claims, rather than the embodiments above, and is intended to include any modifications within the scope and meaning equivalent to the terms of the claims.

REFERENCE SIGNS LIST 1 machine component; 1A rotation symmetry plane; 1B generating line; 11, 12 to 1N, 1i region (rotation symmetry plane); 2 holder; 2A cutting edge; 21 to 2N edge; 2B cutting insert; 3_1 tip end (cutting edge); 3_5 rear end (cutting edge); 3_t point (cutting edge); 10 axial line of rotation; 100

The invention claimed is:

1. A method for manufacturing a machine component having a rotation symmetry plane, the method comprising:
machining the rotation symmetry plane by feeding a linear or curved cutting edge while the cutting edge is in contact with a point of cutting of the rotation symmetry plane,
the machining the rotation symmetry plane including
determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis, and
feeding the cutting edge along the track,
the determining a track including calculating a coordinate (X(t), Y(t), Z(t)) of a first end portion of the cutting edge in accordance with $$X(t)=(R_{sh}(t)\cos\phi(t)-X_{chip}(t))$$

$$Y(t)=(R_{sh}(t)\sin\phi(t)Y_{chip}(t))$$

$$Z(t)=(Z_{sh}(t)-Z_{chip}(t)),$$

where a variable t assumes (N+1) values not smaller than 0 and not greater than 1,
a coordinate (X(0), Y(0), Z(0)) being a coordinate of the first end portion of the cutting edge positioned at a cutting start position of the rotation symmetry plane and an origin of the three-dimensional orthogonal coordinate system,
$(X_{chip}(t), Y_{chip}(t), Z_{chip}(t))$ representing a coordinate representing a position of the cutting edge in contact with the rotation symmetry plane at the point of cutting with the first end portion of the cutting edge being defined as a reference,
$(X_{chip}(1), Y_{chip}(1), Z_{chip}(1))$ representing a coordinate of a second end portion of the cutting edge positioned at a cutting end position of the rotation symmetry plane,
$R_{sh}(t)$ representing a radius of the rotation symmetry plane corresponding to a distance from a center of rotation on the Z axis to the point of cutting,
$Z_{sh}(t)$ representing a coordinate on the Z axis of the center of rotation,
$\phi(t)$ representing an angle formed by a straight line connecting the point of cutting projected on an XY plane and an origin of the XY plane to each other with respect to the X axis,
$\phi(t)$ satisfying a condition $$\tan\phi(t) = \frac{\tan\beta\cdot\tan\theta_s - \tan\theta\cdot\sqrt{\tan^2\theta+\tan^2\beta-\tan^2\theta_s}}{\tan\theta\cdot\tan\theta_s + \tan\beta\cdot\sqrt{\tan^2\theta+\tan^2\beta-\tan^2\theta_s}},$$

$\phi(t)$ representing an angle formed by an ith region in contact with the point of cutting of the N regions of the cutting edge with respect to the Z axis when the ith region is projected on an XZ plane,
$\beta(t)$ representing an angle formed by the ith region with respect to the Z axis when the ith region is projected on a YZ plane, and
$\theta_s(t)$ representing an angle representing a target inclination of the rotation symmetry plane at the point of cutting.

2. The method for manufacturing a machine component according to claim 1, wherein
the cutting edge is in a curved shape, and
t is determined to divide a central angle determined in accordance with a radius of curvature of the curved shape into N equal parts.

3. The method for manufacturing a machine component according to claim 1, wherein
the cutting edge is linear, and
t is determined to divide a length of the cutting edge between the first end portion and the second end portion into N equal parts.

4. An apparatus for manufacturing a machine component, comprising:
a feed mechanism configured to feed a holder in a direction of an X axis, a direction of a Y axis, and a direction of a Z axis;
a drive unit configured to drive the feed mechanism, and
a control unit configured to control the drive unit and to machine a rotation symmetry plane by controlling the feed mechanism to feed a linear or curved cutting edge while the cutting edge is in contact with a point of cutting of the rotation symmetry plane,
wherein machining the rotation symmetry plane includes:
determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis, and
feeding the cutting edge along the track,
the determining a track including calculating a coordinate (X(t), Y(t), Z(t)) of a first end portion of the cutting edge in accordance with $$X(t)=(R_{sh}(t)\cos\phi(t)-X_{chip}(t))$$

$$Y(t)=(R_{sh}(t)\sin\phi(t)Y_{chip}(t))$$

$$Z(t)=(Z_{sh}(t)-Z_{chip}(t)),$$

where a variable t assumes (N+1) values not smaller than 0 and not greater than 1,
a coordinate (X(0), Y(0), Z(0)) being a coordinate of the first end portion of the cutting edge positioned at a cutting start position of the rotation symmetry plane and an origin of the three-dimensional orthogonal coordinate system,
$(X_{chip}(t), Y_{chip}(t), Z_{chip}(t))$ representing a coordinate representing a position of the cutting edge in contact with the rotation symmetry plane at the point of cutting with the first end portion of the cutting edge being defined as a reference,
$(X_{chip}(1), Y_{chip}(1), Z_{chip}(1))$ representing a coordinate of a second end portion of the cutting edge positioned at a cutting end position of the rotation symmetry plane,
$R_{sh}(t)$ representing a radius of the rotation symmetry plane corresponding to a distance from a center of rotation on the Z axis to the point of cutting,
$Z_{sh}(t)$ representing a coordinate on the Z axis of the center of rotation, φ(t) representing an angle formed by a straight line connecting the point of cutting projected on an XY plane and an origin of the XY plane to each other with respect to the X axis, φ(t) satisfying a condition $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}},$$

θ(t) representing an angle formed by an ith region in contact with the point of cutting of the N regions of the cutting edge with respect to the Z axis when the ith region is projected on an XZ plane, β(t) representing an angle formed by the ith region with respect to the Z axis when the ith region is projected on a YZ plane, and $\theta_s(t)$ representing an angle representing a target inclination of the rotation symmetry plane at the point of cutting.

5. A method for machining a rotation symmetry plane comprising:
  machining the rotation symmetry plane by feeding a linear or curved cutting edge while the cutting edge is in contact with a point of cutting of the rotation symmetry plane,
  the machining the rotation symmetry plane including
    determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis, and
    feeding the cutting edge along the track,
  the determining a track including calculating a coordinate (X(t), Y(t), Z(t)) of a first end portion of the cutting edge in accordance with $X(t)=(R_{sh}(t)\cos \phi(t)-X_{chip}(t))$ $Y(t)=(R_{sh}(t)\sin \phi(t)Y_{chip}(t))$ $Z(t)=(Z_{sh}(t)-Z_{chip}(t)),$ where a variable t assumes (N+1) values not smaller than 0 and not greater than 1,
  a coordinate (X(0), Y(0), Z(0)) being a coordinate of the first end portion of the cutting edge positioned at a cutting start position of the rotation symmetry plane and an origin of the three-dimensional orthogonal coordinate system,
  $(X_{chip}(t), Y_{chip}(t), Z_{chip}(t))$ representing a coordinate representing a position of the cutting edge in contact with the rotation symmetry plane at the point of cutting with the first end portion of the cutting edge being defined as a reference,
  $(X_{chip}(1), Y_{chip}(1), Z_{chip}(1))$ representing a coordinate of a second end portion of the cutting edge positioned at a cutting end position of the rotation symmetry plane,
  $R_{sh}(t)$ representing a radius of the rotation symmetry plane corresponding to a distance from a center of rotation on the Z axis to the point of cutting,
  $Z_{sh}(t)$ representing a coordinate on the Z axis of the center of rotation, φ(t) representing an angle formed by a straight line connecting the point of cutting projected on an XY plane and an origin of the XY plane to each other with respect to the X axis, φ(t) satisfying a condition $$\tan\phi(t) = \frac{\tan\beta \cdot \tan\theta_s - \tan\theta \cdot \sqrt{\tan^2\theta + \tan^2\beta - \tan^2\theta_s}}{\tan\theta \cdot \tan\theta_s + \tan\beta \cdot \sqrt{\tan^2\theta + \tan^2\beta - \tan^2\theta_s}},$$

θ(t) representing an angle formed by an ith region in contact with the point of cutting of the N regions of the cutting edge with respect to the Z axis when the ith region is projected on an XZ plane, β(t) representing an angle formed by the ith region with respect to the Z axis when the ith region is projected on a YZ plane, and $\theta_s(t)$ representing an angle representing a target inclination of the rotation symmetry plane at the point of cutting.

6. A computer readable recording medium having a program recorded thereon, the program being for manufacturing a machine component having a rotation symmetry plane, the program causing a computer to perform:
  machining the rotation symmetry plane by feeding a linear or curved cutting edge while the cutting edge is in contact with a point of cutting of the rotation symmetry plane,
  the machining the rotation symmetry plane including
    determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis, and
    feeding the cutting edge along the track,
  the determining a track including calculating a coordinate (X(t), Y(t), Z(t)) of a first end portion of the cutting edge in accordance with $X(t)=(R_{sh}(t)\cos \phi(t)-X_{chip}(t))$ $Y(t)=(R_{sh}(t)\sin \phi(t)Y_{chip}(t))$ $Z(t)=(Z_{sh}(t)-Z_{chip}(t)),$ where a variable t assumes (N+1) values not smaller than 0 and not greater than 1,
  a coordinate (X(0), Y(0), Z(0)) being a coordinate of the first end portion of the cutting edge positioned at a cutting start position of the rotation symmetry plane and an origin of the three-dimensional orthogonal coordinate system,
  $(X_{chip}(t), Y_{chip}(t), Z_{chip}(t))$ representing a coordinate representing a position of the cutting edge in contact with the rotation symmetry plane at the point of cutting with the first end portion of the cutting edge being defined as a reference,
  $(X_{chip}(1), Y_{chip}(1), Z_{chip}(1))$ representing a coordinate of a second end portion of the cutting edge positioned at a cutting end position of the rotation symmetry plane,
  $R_{sh}(t)$ representing a radius of the rotation symmetry plane corresponding to a distance from a center of rotation on the Z axis to the point of cutting,
  $Z_{sh}(t)$ representing a coordinate on the Z axis of the center of rotation, φ(t) representing an angle formed by a straight line connecting the point of cutting projected on an XY plane and an origin of the XY plane to each other with respect to the X axis, φ(t) satisfying a condition $$\tan \phi(t) = \frac{\tan \beta \cdot \tan \theta_s - \tan \theta \cdot \sqrt{\tan^2 \theta + \tan^2 \beta - \tan^2 \theta_s}}{\tan \theta \cdot \tan \theta_s + \tan \beta \cdot \sqrt{\tan^2 \theta + \tan^2 \beta - \tan^2 \theta_s}},$$

θ(t) representing an angle formed by an ith region in contact with the point of cutting of the N regions of the cutting edge with respect to the Z axis when the ith region is projected on an XZ plane, β(t) representing an angle formed by the ith region with respect to the Z axis when the ith region is projected on a YZ plane, and $\theta_s(t)$ representing an angle representing a target inclination of the rotation symmetry plane at the point of cutting.

* * * * *